('12') United States Patent
Liao et al.

(10) Patent No.: US 12,333,058 B2
(45) Date of Patent: Jun. 17, 2025

(54) METHOD, CIRCUIT AND RADAR FOR DETECTING A REGISTER

(71) Applicant: SUTENG INNOVATION TECHNOLOGY CO., LTD., Shenzhen (CN)

(72) Inventors: Yumin Liao, Shenzhen (CN); Junling Zang, Shenzhen (CN); Renfang Huang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 182 days.

(21) Appl. No.: 18/144,149

(22) Filed: May 5, 2023

(65) Prior Publication Data
US 2023/0385460 A1     Nov. 30, 2023

(30) Foreign Application Priority Data

May 26, 2022  (CN) .......................... 202210582921.8

(51) Int. Cl.
   *G06F 21/78*     (2013.01)
   *G01S 13/931*    (2020.01)
   *G06F 21/64*     (2013.01)

(52) U.S. Cl.
   CPC ............ *G06F 21/78* (2013.01); *G01S 13/931* (2013.01); *G06F 21/64* (2013.01); *G01S 2013/9323* (2020.01)

(58) Field of Classification Search
   CPC .......... G06F 21/78; G06F 21/64; G06F 21/55; G01S 13/931; G01S 2013/9323; G01S 7/497; G01S 7/02; G01S 15/931; G01S 17/931; G01S 2013/9318; G01S 2013/93185; G01S 2013/9319; G01S 2013/9324; G01S 2013/93273
   See application file for complete search history.

(56) References Cited

U.S. PATENT DOCUMENTS

| | | | |
|---|---|---|---|
| 8,856,960 B2* | 10/2014 | Puttaswamy Naga | ...................... H04L 9/3247 726/30 |
| 10,613,918 B2* | 4/2020 | van de Haar | .......... G11C 29/04 |
| 2004/0081317 A1* | 4/2004 | Miyauchi | .................. G06F 7/72 380/28 |
| 2005/0149737 A1* | 7/2005 | Driscoll | .................. G06F 21/51 713/182 |
| 2009/0302883 A1* | 12/2009 | Duflot | ................ H03K 19/0013 326/8 |

(Continued)

FOREIGN PATENT DOCUMENTS

CN            113300716 A   *   8/2021   ............ H03M 13/09

OTHER PUBLICATIONS

First Office Action issued in related Chinese Application No. 202210582921.8, mailed Aug. 30, 2024, 10 pages.

*Primary Examiner* — Khalid M Almaghayreh
(74) *Attorney, Agent, or Firm* — BAYES PLLC

(57) ABSTRACT

This application relates to a method, circuit, and radar for detecting a register. The method for detecting the register includes: performing a signature operation on a first data to obtain a first signature; storing the first data in a data register; performing a signature operation on a second data stored in the data register, to obtain a second signature; and comparing the first signature and the second signature to detect the data register.

12 Claims, 18 Drawing Sheets

(56) References Cited

U.S. PATENT DOCUMENTS

| | | | |
|---|---|---|---|
| 2010/0218059 A1* | 8/2010 | Gangasani | G01R 31/318385 714/728 |
| 2010/0275028 A1* | 10/2010 | Takashima | H04L 9/3247 714/E11.002 |
| 2011/0283362 A1* | 11/2011 | Horneff | H04H 20/38 455/3.06 |
| 2013/0212710 A1* | 8/2013 | Puttaswamy Naga | H04L 9/3247 726/30 |
| 2016/0077904 A1* | 3/2016 | Wendel | G06F 11/0772 714/819 |
| 2018/0211021 A1* | 7/2018 | Negi | H04L 9/3231 |
| 2019/0250974 A1* | 8/2019 | van de Haar | G06F 11/0745 |
| 2020/0201978 A1* | 6/2020 | Dewost | G06F 21/32 |
| 2023/0221949 A1* | 7/2023 | Lan | G06F 21/64 717/168 |
| 2023/0396430 A1* | 12/2023 | Meyers | G07F 17/3241 |
| 2023/0396442 A1* | 12/2023 | Meyers | G07F 17/3241 |

* cited by examiner

METHOD, CIRCUIT AND RADAR FOR DETECTING A REGISTER

CROSS-REFERENCE TO RELATED APPLICATION

The present application claims the benefit of priority to Chinese Patent Application No. 202210582921.8, filed on May 26, 2022, which is hereby incorporated by reference in its entirety.

TECHNICAL FIELD

This application relates to the field of computer technology, particularly to a method, circuit, and radar for detecting a register.

BACKGROUND

With the rapid development of computer technology, information technology, and other related fields, information security issues have become increasingly important to people's attention. For autonomous driving technology, information security is also related to the personal safety and property security of users.

As a vital component for achieving autonomous driving, the high reliability of the output data of radar is the basis for protecting the personal and property safety of users. The main control chip of the radar can achieve specific functions based on the information stored in the internal register. Whether the information in the register is correct greatly affects the normal operation of LiDAR

SUMMARY

To tackle the problems existing in the relevant technology, this application provides a method, circuit, and radar for detecting a register, which can detect a register, improve information security, and thereby enhance user personal and property safety.

This application provides a method for detecting a register, including: performing a signature operation on a first data to obtain a first signature; storing the first data in a data register; performing the signature operation on a second data stored in the data register, to obtain a second signature; and comparing the first signature and the second signature to detect the data register.

The second aspect of this application provides a circuit for detecting a register, including: a first signature operation unit, a data register, a second signature operation unit, and a comparator. The first signature operation unit is configured to perform a signature operation on a first data to obtain a first signature; the data register is connected to the first signature operation unit, and is configured to store the first data; the second signature operation unit is connected to the data register, and is configured to perform a signature operation on a second data stored in the data register, to obtain a second signature; and the comparator is connected to the first signature operation unit and the second signature operation unit, respectively, and is configured to compare the first signature and the second signature to detect the data register.

The third aspect of this application provides a board, including the circuit for detecting the register as described above.

The fourth aspect of this application provides a radar, including the circuit for detecting the register as described above.

The fifth aspect of this application provides an electronic device comprising a processor and a memory storing executable code that, when executed by the processor, causes the processor to perform the above-mentioned method.

The sixth aspect of this application provides a computer-readable storage medium on which executable code is stored. When the executable code is executed by the processor of an electronic device, the processor performs the method described above.

The seventh aspect of this application provides a computer program product, including executable code, which, when executed, implements the above method.

The technology solution provided in this application include the following effects.

In some embodiments of this application, signature operation is performed on data stored in register to obtain a first signature, and then signature operation is performed on the data stored in register to obtain the second signature. By comparing the first signature and the second signature, it is determined whether the data stored in the registers is correct, thereby detecting the registers and effectively improving their reliability, which helps enhance user personal and property safety.

In addition, in some embodiments, this application introduces random numbers in the process of calculating signature, which enhances the reliability of the signature.

In addition, in some embodiments, this application provides a technical solution for low-bit fast digital signature, which can balance the contradiction between production cost and information security.

In addition, in some embodiments, this application strengthens the signature strength against the first data by using two-level signatures, thereby enhancing information security.

In addition, in some embodiments of this application, when the register is attacked and its value is changed, the abnormal signature can be quickly detected through digital signature, and signals such as interrupt alarms and chip resets can be issued to enhance the personal and property safety of the user.

It should be understood that the general description above and the detailed description in the following text are only exemplary and explanatory, and do not limit the scope of this application.

BRIEF DESCRIPTION OF DRAWINGS

By combining the attached figures to provide a more detailed description of the exemplary embodiments of the present application, the above and other purposes, features, and advantages of the present application will become more apparent. In the exemplary embodiments of the present application, the same reference numerals usually represent the same components.

DETAILED DESCRIPTION

Figure 1:
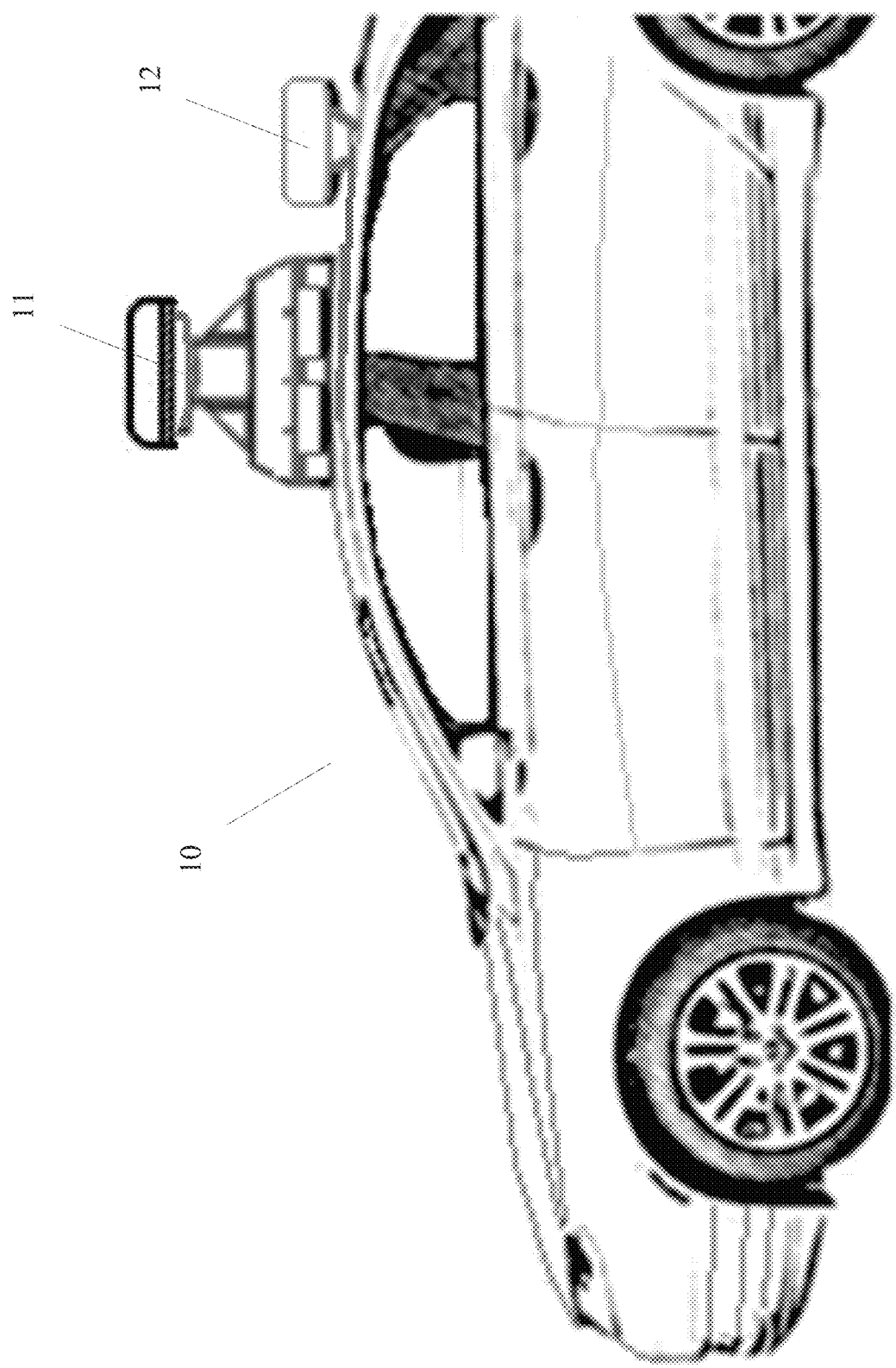
FIG. 1 is a schematic diagram of an application scenario referring to a method, circuit, and radar for detecting a register shown in an embodiment of the present application.

The following will describe in more detail the implementation of this application with reference to the attached figures. Although the implementation of this application is shown in the figures, it should be understood that this should not be limited to the implementation described here and can be implemented in various forms.

The terminology used in this application is solely for the purpose of describing specific embodiments and is not intended to limit the scope of the application. The use of the singular form "a" and "the" in this application and the attached claims is also intended to include the plural form, unless the context clearly indicates otherwise. It should also be understood that the term "and/or" used in this document refers to any or all possible combinations of one or more of the listed items.

It should be understood that although the terms "first," "second," "third," etc. may be used to describe various information in this application, these pieces of information should not be limited to these terms. These terms are only used to distinguish the same type of information from each other. For example, without departing from the scope of this application, the first information can also be referred to as the second information, and similarly, the second information can also be referred to as the first information. Therefore, limiting features with "first" and "second" can explicitly or implicitly include one or more of these features. In the description of this application, the meaning of "multiple" is two or more, unless otherwise specifically limited.

In order to facilitate the understanding of this application, an explanation of the concepts involved in this application will be provided first.

Vehicle-mounted radar: detection distance can range from 200 meters to 500 meters, and the recognizable physical attributes can include distance and reflectivity. It can be used for small machines such as vehicles and robots. Vehicle-mounted radar includes vehicle-mounted laser radar, vehicle-mounted millimeter wave radar, and vehicle-mounted ultrasonic wave radar.

Vehicle-mounted LiDAR: by emitting outgoing light such as a 900 nm wavelength laser beam, the outgoing light will be reflected by obstacles when encountered. The processing unit calculates the distance between the obstacle and the vehicle-mounted LiDAR based on the time difference between the reflected light and the outgoing light. In addition, the processing unit can also estimate the reflectivity of the target based on the waveform area of the reflected light. Due to its small size and high integration, vehicle-mounted LiDAR is widely used.

In the scene of autonomous driving, the system architecture applicable to autonomous driving scenarios can include mobile devices, networks, and the cloud. Mobile devices include but are not limited to: cars, ships, robots, aircraft, etc. Electronic devices such as sensors can be installed on mobile devices to obtain information about obstacles in the surrounding environment. Electronic devices may include radar, image sensors, etc. Multiple electronic devices require the use of registers during operation or communication.

Embodiments of this application provide a method, circuit, and radar for detecting a register. By performing signature operations on the data stored in the register and the stored data in the register, separately, two signatures are obtained. In this way, the occurrence of abnormalities in the register can be detected by comparing these two signatures, effectively improving the security and reliability of the register. This enables electronic devices to securely and reliably perform specific functions based on the information stored in the register, thereby ensuring the personal and property safety of users.

The following technical solution of embodiments of the present application is described in detail in conjunction with the drawings.

FIG. 1 is a schematic diagram of an application scenario referring to a method, a circuit, and a radar for detecting a register shown in an embodiment of the present application.

FIG. 1 shows a hardware configuration of vehicle 10 that supports advanced driver assistance or autonomous driving functions. For example, at least one Light Detection and Ranging (LIDAR) 11 is mounted on the roof and/or side of the vehicle 10. The detection area of LIDAR 11 can be fixed, such as when a certain LIDAR 11 is used to detect a preset area. The detection area of LIDAR 11 can also be adjustable, such as when the LIDAR on the vehicle body can scan multiple detection areas by adjusting its posture, or by adjusting the field of view of the LIDAR itself. In some embodiments, vehicle 10 can be equipped with five LIDARs 11: on the top, front, rear, left, and right sides of the vehicle. By using multiple LIDARs 11, the contours and distances to objects in the surrounding area of the vehicle can be detected.

In addition, vehicle 10 can also be equipped with a shooting device. The shooting device can capture the environment in front of the vehicle from a predetermined angle.

For example, the shooting device can be a monocular camera, a multi-camera, and so on.

In addition, multiple millimeter-wave radars can be mounted around vehicle 10. For example, vehicle 10 is equipped with four millimeter-wave radars to detect the left and right sides in front of and behind the vehicle. The millimeter-wave radar can detect the distance of objects within its detection area and the relative speed of the object with vehicle 10.

Furthermore, vehicle 10 can also be equipped with positioning devices such as Beidou positioning devices, Global Positioning System (GPS), etc. With the positioning device 12, the current location of vehicle 10 can be determined.

In addition, the vehicle 10 can also be equipped with an Electronic Control Unit (ECU). The detection signals of at least one of the aforementioned LIDAR 11, millimeter wave radar, and positioning device 12 are sent to the ECU. The ECU can detect and identify obstacles (such as roadblocks, moving objects, trees, adjacent vehicles, etc.) based on these signals. In addition, the ECU can be divided into multiple units based on its functions, which are collectively referred to as the ECU in this application.

It should be noted that although mobile devices are described as cars, such descriptions are not limiting. Various mobile devices are applicable, such as land robots, water robots, and so on.

Figure 2:
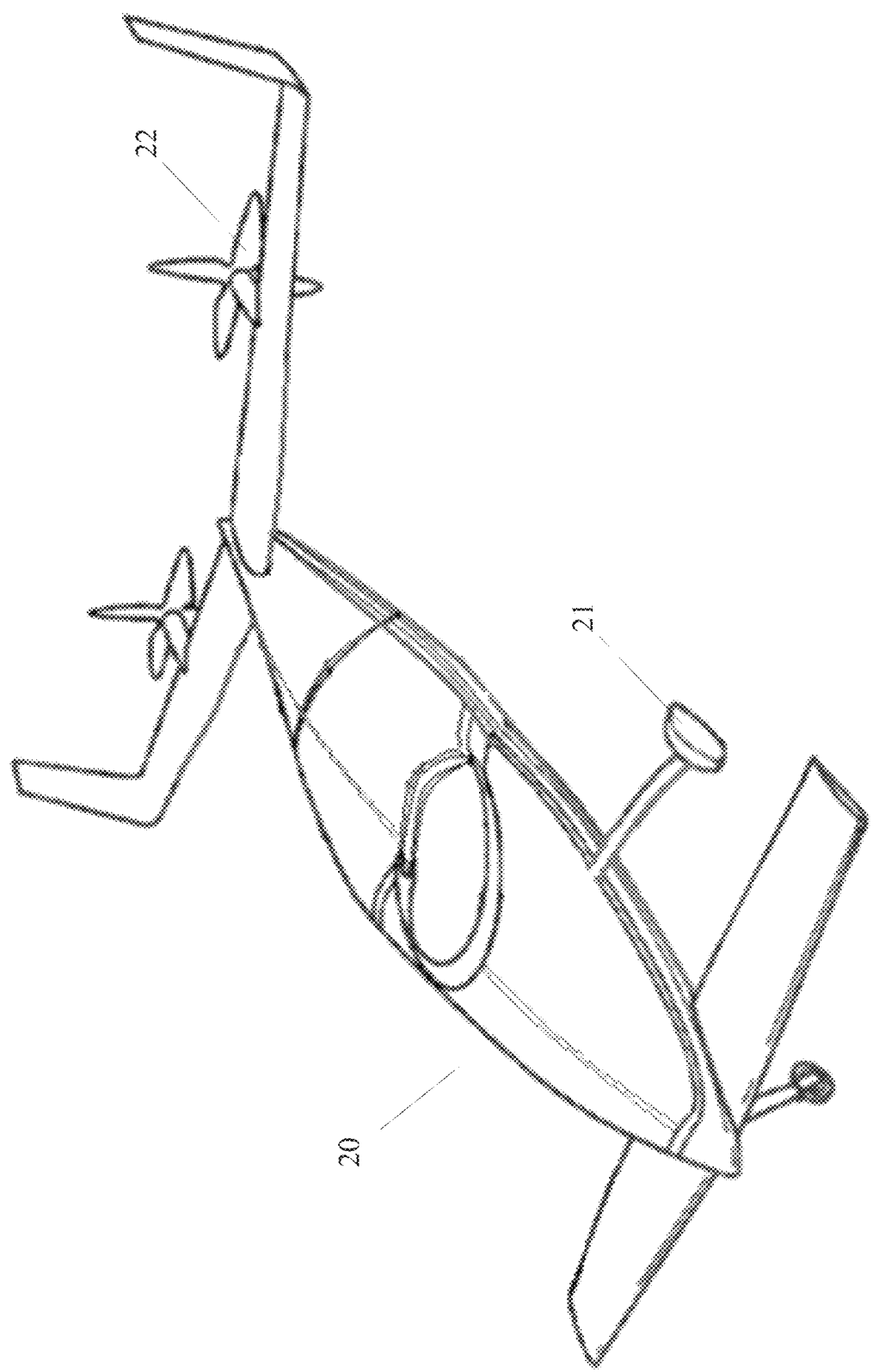
FIG. 2 is a schematic diagram of another application scenario referring to a method, circuit, and radar for detecting a register shown in an embodiment of this application.

FIG. 2 is a schematic diagram of another application scenario referring to a method, circuit, and radar for detecting a register shown in an embodiment of the present application.

The aircraft 20 shown in FIG. 2 can be an aircraft with assistant driving function and automatic driving function. The aircraft 20 may include a sensing system 21 and a power mechanism 22.

The sensing system 21 can include one or more sensors to sense at least one of the peripheral obstacles, spatial orientation, speed, or acceleration of the aircraft 20. The types of sensors include but are not limited to: ranging sensors, position sensors, motion sensors, inertial sensors or image sensors. The sensing data provided by the sensing system 21 can be used to control the spatial orientation, speed and/or acceleration of the aircraft 20. The sensing system 21 is used to collect relevant information about the aircraft 20. Different types of sensors can sense different types of signals or signals from different sources. For example, sensors include radar, inertial sensors, GPS sensors, or visual/image sensors (such as cameras).

The method, circuit, and radar for detecting a register in embodiments of this application example can be applied to any one or more electronic devices that require a clock, such as LIDAR 11, millimeter wave radar, positioning device 12, ECU, sensing system 21, or communication system, as shown in FIG. 1 or FIG. 2.

In the above-mentioned application scenarios such as assisted driving, autonomous driving, and intelligent transportation, the rapid and accurate perception of the surrounding environment of mobile devices is a key point.

As an illustrative example, the scenario of autonomous driving for vehicles is taken. Based on the information about the vehicle's position, obstacles, and road conditions sensed by the sensing system, road signal control can be coordinated to improve the quality and efficiency of road management. In some embodiments, based on the information sensed by the sensing system, corresponding decisions can be made for autonomous driving vehicles, and the safe distance between them can be adjusted, making it possible for vehicles to travel safely and reliably on the road.

As one of the most important sensors for autonomous driving, a LiDAR can quickly and accurately perceive surrounding environmental information in the fields of intelligent transportation, assisted driving, and autonomous driving. This allows for the coordination of road control signals based on road, vehicle position, and obstacle information, thereby improving the quality and efficiency of road management. In addition, the LiDAR can assist in determining driving decisions, adjusting the safe distance between vehicles, and ensuring that vehicles can travel safely and reliably on the road. For example, the information provided by the LiDAR to the decision-making system, such as the position, size, and motion information of traffic participants, is particularly important. The LiDAR is like the eyes of an autonomous vehicle, and protecting the reliability of the data output by LiDAR is especially important, as it directly affects the personal safety and property security of the occupants of the vehicle, and even their lives.

The main control chip of the LiDAR is the core component of the LiDAR. The main control chip is responsible for at least part of the LiDAR's information acquisition, processing, and transmission. At least some of the functions of the main control chip (such as timing control, waveform algorithm processing, laser driver and control of non-main control chips, etc.) can be implemented based on the information stored in the built-in registers (such as configuration registers). Therefore, whether the information stored in the registers is correct will greatly affect the normal operation of the LiDAR.

However, the applicant found that the register may fail physically due to manufacturing or aging factors. In addition, the register can also be attacked and controlled by hackers in an attempt to break through the chip's security system, causing the chip to operate in the mode expected by the hacker. In both cases, the entire chip-based system is at great risk.

Relevant technologies can be used to defend from the software system level, such as backing up information stored in registers (such as configuration information), and regularly polling the information in the registers to detect unexpected changes. Relevant technologies can also build a secure world for the software, where all important configurations are only performed in the secure world, preventing hackers from entering the software's secure world. However, research on defense monitoring from the chip-level hardware is still limited, and compared to software-based implementation, monitoring based on chip hardware has higher real-time performance and does not rely on the software system. Even if the software system crashes or is hacked, the chip can still continue to work, making it more difficult and costly for hackers to break through.

In some embodiments of this application, by detecting at least some data registers of the main control chip (such as the main control chip of a laser radar, for example, key registers), the generation of digital signatures can be automatically completed during the configuration of key registers. After the configuration is completed, the digital signatures are verified in real-time. When the value of the key register is changed due to an attack, the detection circuit can immediately detect it through the digital signature and issue an interrupt alarm and chip reset notification to protect and dispose of the main control chip.

For example, by performing a signature operation on a first data stored in a data register, a first signature is obtained. Then, by performing a signature operation on a second data read from the data register, a second signature is obtained. By comparing the first and second signatures, it is possible to determine whether there is an anomaly in the data register. In addition, to ensure the correctness of the correspondence between the first signature and the second data stored in the data register, the first data can be written into the data register after the first signature is determined. Furthermore, the first signature can be written into the signature register to achieve synchronous detection of the signature register and the data register. If an anomaly occurs in the signature register, there will be a difference between the first and second signatures stored, resulting in a comparison failure. In addition, a multi-level signature method can be used to increase the risk of the signature algorithm being compromised. By detecting register anomalies from multiple perspectives, the security and reliability of the data stored in the register can be effectively improved, making it easier to achieve the safe operation and data protection of the main control chip of a LiDAR, and thus enhancing the personal and property safety of users.

In some implementation examples, after detecting an abnormality in the data register, interrupt signals or reset signals can also be issued to protect and dispose of the main control chip in the system.

Figure 3:
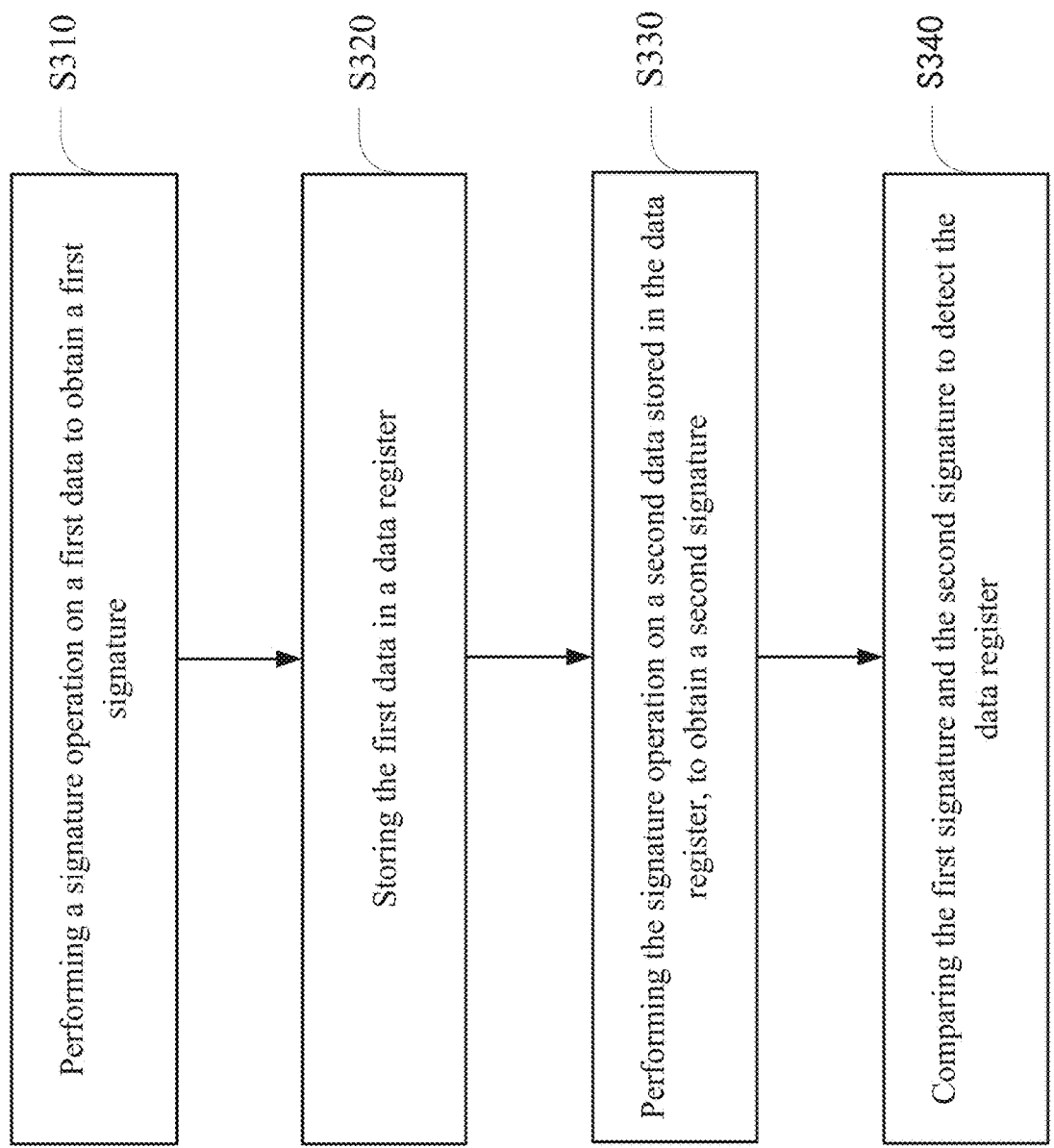
FIG. 3 is a flowchart illustrating a method for detecting a register in an embodiment of the present application.

FIG. 3 is a flowchart illustrating a method for detecting a register in an embodiment of the present application.

Refer to FIG. 3, the method for detecting a register includes operation S310 to operation S340.

Operating S310: perform a signature operation on a first data to obtain a first signature.

In some embodiments, a first data can be data that needs to be stored in a data register, especially data that needs to be stored in a key register. For example, a first data can be configuration information, such as mapping between configuration information and status, in order to control the laser to change its status. The first data can come from the processing unit inside the laser radar, or from an external processing unit such as an ECU.

In an example, signature operation can be achieved through a specific signature algorithm, which is the algorithm of digital signature. Digital signature is a string of numbers that can only be generated by the sender of the information and cannot be forged by others. This string of numbers can also be used to verify whether the data has been attacked, tampered with, etc.

A signature operation can be implemented through hardware, or the signature operation can be implemented through software, or the signature operation can be implemented through both hardware and software.

As an example, the signature operation can be explained through hardware implementation. The hardware can include multiple logical operation units, which process a first data to obtain a first signature. The first signature can also be obtained by combining multiple logical operation units and processing the first data.

In an example, logical operations include but are not limited to: "or", "and", "not". "nor", "nand", "xor", etc. Logical operation units include but are not limited to: "or operation unit", "and operation unit", "not operation unit", "nor operation unit", "nand operation unit", "xor operation unit", etc. These logical operation units can also be called logical operation circuits. In order to obtain the first signature for the first data, a combination of multiple logical operations can be used to achieve it. Correspondingly, a combination of multiple logical operation units can be used to achieve it.

As an example of signature operation implemented through software, this is an illustrative explanation. For instance, a digital signature can be obtained by processing the first data to be signed through a one-way function, resulting in a string used to verify whether any changes have occurred during transmission. Signature algorithms may include, but are not limited to, at least one of the following: Rabin signature, DSS signature, and RSA signature.

As an example, a signature operation is explained by using hardware and software. For instance, after processing the first data through hardware, a string is obtained, and then the string is processed based on the signature algorithm to obtain a first signature. Software processing and hardware processing can also be carried out sequentially. In addition, the number of hardware and software processing is not limited to one time and may be multiple times, which is not specified here.

Operating S320: store the first data in a data register.

The function of a data register is to store binary code, which comprises triggers with storage functions. One trigger can store 1 bit of binary code, so to store n bits of binary code in a register, n triggers are needed. For example, a data register can be used to temporarily store data involved in operations (such as configuration information) and operation results. Registers are a commonly used type of sequential logic circuit, but this type of sequential logic circuit only contains storage circuits.

In some embodiments, data registers include latches or triggers. A latch or trigger can store 1 bit of binary data, so N latches or triggers can form an N-bit register. Data registers are high-speed storage components with limited storage capacity, which can be used to temporarily store instructions, data, addresses, etc. Taking a 16-bit data register as an example, the first data stored can be 0110110011101010, which corresponds to the initialization operation (for illustration purposes).

In some embodiments, after the signature operation for the first data is determined to be completed, the first data can be written into the data register. Additionally, the first data can also be written into the data register after receiving it.

In an example, the first data is written into a data register to be detected, so that the existence of anomalies in the data register can be determined by checking whether the data output from the data register is consistent with the first data. For example, if the data output from the data register is abnormal (such as inconsistent with the original first data), it can be determined that the data register is abnormal, such as register aging or attack. Since signature operation is performed on the first data, the first signature for the first data can be obtained, which can reduce the risk of the first data being leaked and improve information security compared to directly comparing the first data. In addition, using the method of comparing signatures instead of comparing data does not directly manipulate the data, reducing the risk of data errors and improving the security and reliability of data storage in the data register.

It should be noted that in some implementations, there is no specific order between operating S310 and operating S320. One can execute S310 first and then S320, or execute S320 first and then S310. Additionally, it is also possible to execute S310 and S320 simultaneously.

Operating S330: perform a signature operation on a second data stored in the data register to obtain a second signature.

In some embodiments, in order to facilitate the verification of whether the first data and the second data are consistent by comparing the signatures, the above signature operation can be performed on the second data to obtain the second signature. This can achieve the detection of the data register by comparing the first signature and the second signature to verify whether the first data and the second data stored in the data register are consistent.

It should be noted that the signature operation performed in S330 is the same as the signature operation performed in S310. For example, the logical operations performed in the signature operation in S330 are the same as those performed in the signature operation in S310. Similarly, the signature algorithm used in the signature operation in S330 is the same as that used in the signature operation in S310.

In addition, the implementation of the signature operation performed in S330 and the implementation of the signature operation performed in S310 can be the same or different. For example, the signature operation performed in S310 is implemented through hardware, while the signature operation performed in S330 is also implemented through hardware, and both can use the same hardware circuit or different hardware circuits. For instance, the signature operation performed in S310 can be implemented through hardware, while the signature operation performed in S330 can be implemented through software. Similarly, the signature operation performed in S310 can be implemented through software, while the signature operation performed in S330 can be implemented through hardware.

Operating S340: compare the first signature and the second signature to detect the data register.

In some embodiments, the existence of anomalies in the data register is determined, by checking whether the first data stored before the data register is stored and the second data corresponding to the first data stored in the data register are consistent. In some embodiments, by comparing the first signature for the first data and the second signature for the second data, it is determined whether the first data and the second data are consistent, thus effectively improving the security and reliability of the first data (such as configuration information and other important information)."

Figure 4:
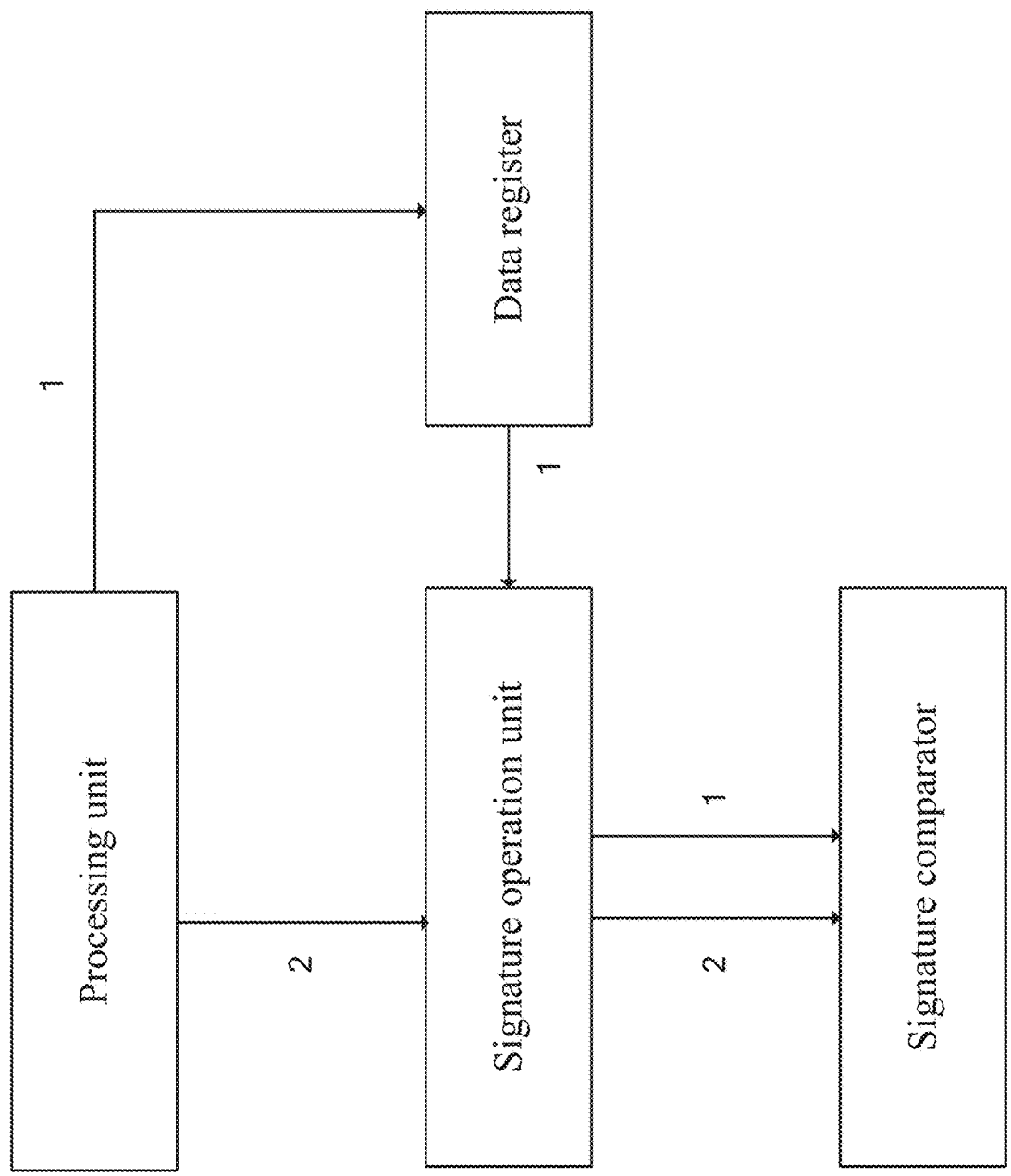
FIG. 4 is a schematic diagram of the data flow for detecting a register shown in an embodiment of the present application.

FIG. 4 is a schematic diagram of the data flow for detecting a register shown in an embodiment of the present application.

Referring to FIG. 4, the data flow 1 and data flow 2 between the components in the detection register method are shown. For data flow 1, firstly, a first data from the processing unit is stored in the data register. Then, a second data read from the data register is sent to the signature operation unit. Next, the signature operation unit processes the second data to obtain a second signature. Then, the signature operation unit sends the second signature to the signature comparator for signature comparison. For data flow 2, firstly, a first data from the processing unit is sent to the signature operation unit. Then, the signature operation unit processes the first data to obtain a first signature. Next, the signature operation unit sends the first signature to the signature comparator for signature comparison.

In some implementations, a first data includes (2n) bits, where n is an integer greater than or equal to 1. Specific logical operations are performed on a random number and multiple bits of a first data, to obtain a first signature, which may include performing specific logical operations on the $0^{th}$ to $(n-1)^{th}$ bits and the $n^{th}$ to $(2n-1)^{th}$ bits of the first data to obtain the first signature.

As an example of performing a first-level signature operation on a first data, and the first data includes 16 bits (i.e., n is 8), an illustrative explanation is provided. For example, performing an XOR logical operation on the 0-7 bits of the first data and the 8-15 bits of the first data to obtain the first signature.

It should be noted that the first-level signature operation shown above should not be understood as a limitation on this application. Two-level signature or multi-level signature operations can also be used. Relevant examples will be given in the following sections.

In some implementations, after detecting an abnormality in the data register, the risk caused by the register abnormality can be reduced through measures such as interrupt and/or reset processing.

In some embodiments, the above method may include the following operations, when detecting that the first signature and the second signature are inconsistent: if the first signature and the second signature are inconsistent, at least one of the registers is interrupted or reset.

In some implementations, when a first signature and a second signature are detected to be inconsistent, a reset signal and/or interrupt signal are outputted. The reset signal can cause the laser radar or the main control chip of the laser radar to reset, attempting to eliminate register anomalies through reset. The interrupt signal can cause the laser radar to stop outputting information, or prompt the system that the reliability of the output information is questionable, in order to improve the user's ability to handle anomalies as soon as possible.

In addition, it is also possible to set a threshold for the number of signature inconsistencies corresponding to the number of signature inconsistencies that are not consistent with the signature (or the number of consecutive signature inconsistencies that are not consistent with the signature), based on the accumulated number of signature inconsistencies (or the number of consecutive signature inconsistencies) and the threshold to determine the corresponding processing method.

For example, the threshold for consecutive occurrences of inconsistent signatures includes a first threshold and a second threshold, corresponding to the levels of occasional abnormality and abnormality, respectively. When the number of consecutive inconsistencies is greater than the level of occasional abnormality, but less than the level of abnormality, a reset signal and an alarm signal can be output. When the number of consecutive inconsistencies is greater than the level of abnormality, an interrupt signal can be output. It should be noted that the conditions for outputting reset and/or interrupt signals mentioned above are only illustrative and should not be construed as limitations of the present application.

In some embodiments, the reset signal will reset the main circuit and clear critical information. The interrupt signal can be sent to the CPU, the CPU is allowed to respond to the interrupt signal and perform corresponding processing based on the interrupt type, such as destroying important information, restarting, or shutting down the LiDAR.

It should be noted that in addition to reset and interrupt handling, other processing methods can also be introduced, such as replacing registers, alarm handling, etc., which are not limited here.

In some implementations, the above method may also include: configuring the above first threshold and/or second threshold. This allows users to set and/or modify the thresholds.

In some implementations, the above method may also include, an anomaly analysis unit. The anomaly analysis unit can be part of the anomaly handling module or a separate module.

For example, the anomaly analysis unit is configured to determine the anomaly type based on the results of the first and second anomaly detection subunits, and output the anomaly type. The anomaly type can be output to the CPU. ECU, etc., in order to take corresponding processing measures.

In order to facilitate the understanding of the technical scheme of this application, the following is an illustrative description of the signature operation process.

In some implementations, in order to enhance the anti-attack capability and reliability of the first and/or second signature, the first signature can be generated based on random numbers and a first data.

For example, performing a signature operation on the first data can result in a first signature, which may include the following steps: performing specific logical operations on the random number and multiple bits of the first data to obtain the first signature.

In some embodiments, when configuring registers (such as key registers), automatic digital signature is completed. After the configuration is completed, real-time verification of the digital signature is performed. When a key register is attacked and a first data is changed, the above anomaly can be detected in time by comparing the digital signature. In addition, an interrupt signal and/or reset signal can be issued to notify the system to protect and dispose, such as protecting and disposing the main control chip of the laser radar system.

In some implementations, in order to increase the security and reliability of the signature, random number generating unit can be used to generate random number, and a first signature can be generated based on the random number and a first data.

Figure 5:
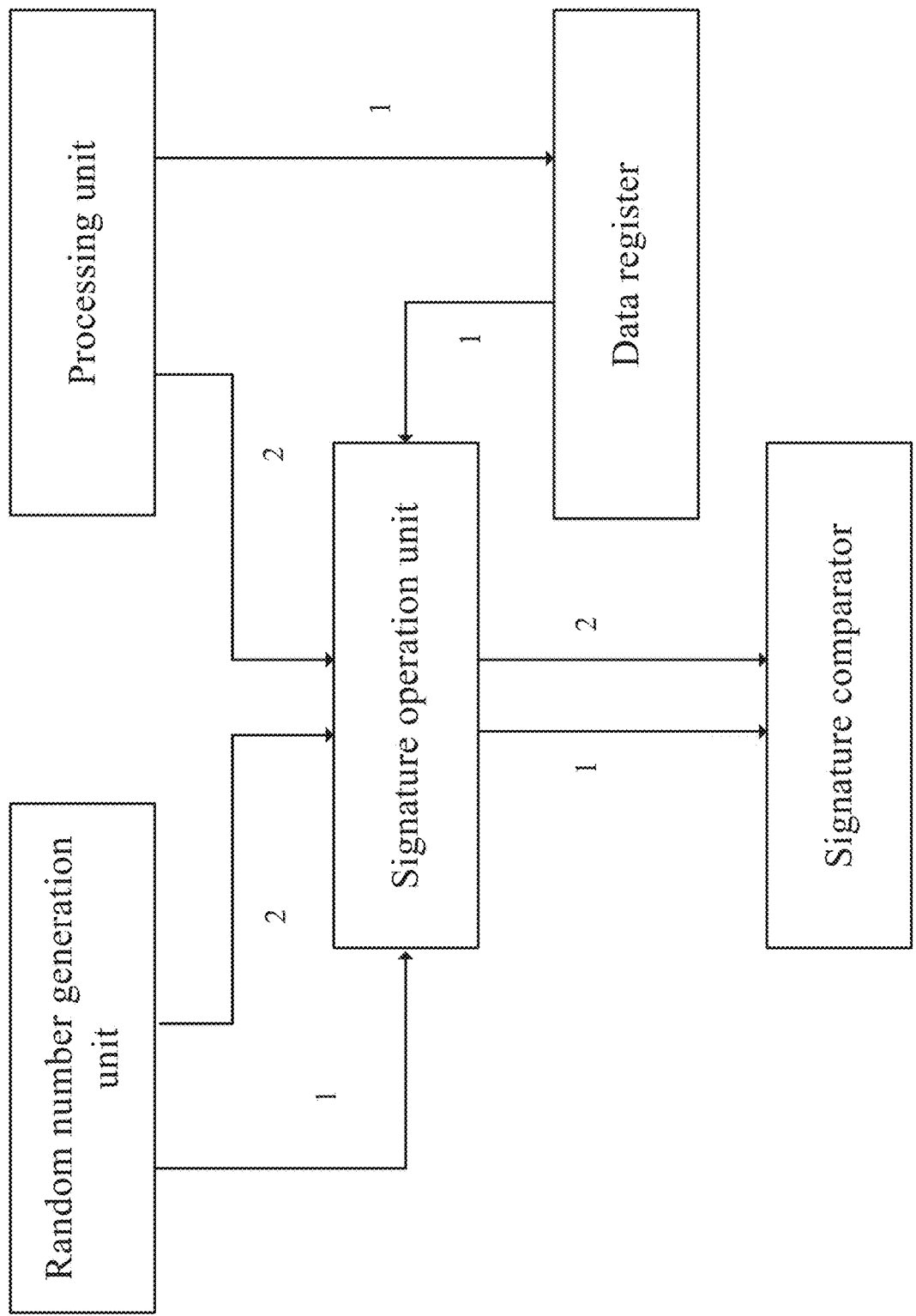
FIG. 5 is another schematic diagram of the data flow for detecting a register shown in an embodiment of the present application.

FIG. 5 is another schematic diagram of the data flow for detecting a register shown in an embodiment of the present application.

Referring to FIG. 5, the process of generating a first signature based on random numbers and a first data can include data streams 1 and 2. For example, data stream 1 includes: firstly, the processing unit outputs the first data to a data register. Then, the data register stores a second data and the random number generated by the random number generation unit, which are jointly sent to the signature operation unit. Next, the signature operation unit generates a second signature based on the second data and the random number. Finally, the signature operation unit sends the second signature to the signature comparator for signature comparison.

Data stream 2 includes; firstly, the processing unit outputs the first data to the signature operation unit. Then, based on the first data and the random number from the random number generation unit, the signature operation unit generates the first signature. Finally, the signature operation unit sends the first signature to the signature comparator for signature comparison.

In an example, random numbers can be classified as true random numbers or pseudo-random numbers.

For example, in the generation process of true random numbers, random physical processes (such as environmental noise, thermal noise of circuits, radioactive decay, etc.) can be used as random sources, and implemented through analog circuits. True random numbers are obtained through digital post-processing. True random numbers have no regularity and are unpredictable. Attackers cannot predict the next data generated through analyzing large amounts of data. True random numbers can be generated by True Random Number Generators (TRNG). The unpredictability of TRNG makes it impossible for attackers to guess the first data corresponding to the first signature according to general rules, thus enhancing the security of the first data.

Pseudo-random numbers can be generated using a fixed generation algorithm. In order to increase the unpredictability of pseudo-random numbers, an initial seed can be set. However, pseudo-random numbers still have a pattern that can be followed. For example, an attacker can obtain the generation algorithm of pseudo-random numbers through data analysis. However, pseudo-random numbers have the advantages of being easy to use and not requiring additional hardware devices. Pseudo-random numbers can be generated by a Pseudo Random Number Generator (PRNG) unit.

It should be noted that in scenarios where information security is highly demanded and may affect the personal and/or property safety of users, true random numbers can be used to enhance security.

There are various methods for implementing true random number generators in circuit design, such as discrete time chaos implementation, oscillation sampling method, direct amplification of thermal noise method, etc. Among them, the random source of the oscillation sampling method mainly comes from the phase jitter and noise of the oscillator. The sub-stable state in the circuit generates phase jitter, and the thermal noise in the circuit generates phase noise. The implementation circuit of the oscillation sampling method is relatively simple, and the quality of the generated true random numbers is high, so it is widely used. In some embodiments, the random number source part can be implemented using analog circuits, and the post-processing part can be implemented using digital circuits.

In this implementation, the introduction of random numbers effectively enhances the difficulty and reliability of cracking the signature, improves information security, and thereby enhances the personal and property safety of users.

In some implementations, in order to further enhance the difficulty and reliability of cracking the first signature and/or the second signature, the signature strength for the first data and/or the second data can be strengthened by at least two levels of signature.

For example, a first data includes (2n) bits, where n is an integer greater than or equal to 1. Correspondingly, specific logical operations are performed on a random number and multiple bits of the first data, resulting in a first signature. The first signature includes performing specific logical operations on the $0^{th}$ bit to the $(n-1)^{th}$ bit of the first data and the first sub-result. The first sub-result is determined by performing specific logical operations on a first random number and the $n^{th}$ bit to the $(2n-1)^{th}$ bit of the first data.

Figure 6:
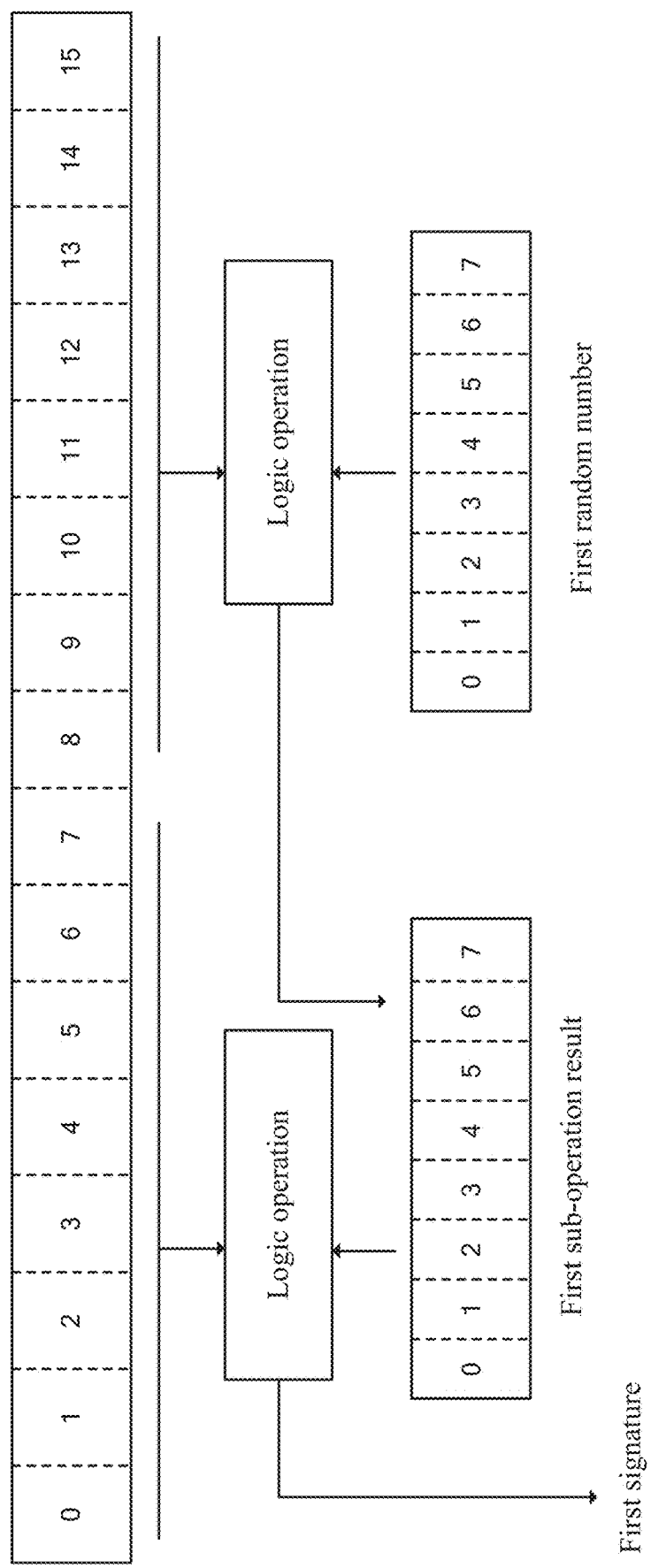
FIG. 6 is another schematic diagram of the data flow for detecting a register shown in an embodiment of the present application.

FIG. 6 is another schematic diagram of the data flow for detecting a register shown in an embodiment of the present application.

FIG. 6 shows a schematic diagram of a two-stage signature process for a 16-bit first data. The first data includes bit0~bit15, where bit0~bit7 are the $0^{th}$ to $7^{th}$ bits of the first data, and bit8~bit15 are the $8^{th}$ to $15^{th}$ bits of the first data. In FIG. 6, the logical operation is firstly performed between the bit8~bit15 of the first data and the first random number, to obtain the first sub-result, where the number of bits of the first random number can be the same as or different from that of the bit8~bit15 of the first data. After obtaining the first sub-result, the logical operation can be performed between the first sub-result and the bit0~bit7 of the first data, to obtain the first signature.

It should be noted that the calculation process of a second signature can refer to the calculation process of the first signature, which will not be described in detail here.

For example, the first data packet includes (2n) bits, where n is an integer greater than or equal to 1. Correspondingly, by performing specific logical operations on the random number and multiple bits of a first data, a first signature can be obtained, which includes performing specific logical operations on the $n^{th}$ bit to the $(2n-1)^{th}$ bit of the first data and a second sub-result. The second sub-result is determined by performing specific logical operations on a second random number and the $0^{th}$ bit to the $(n-1)^{th}$ bit of the first data.

Figure 7:
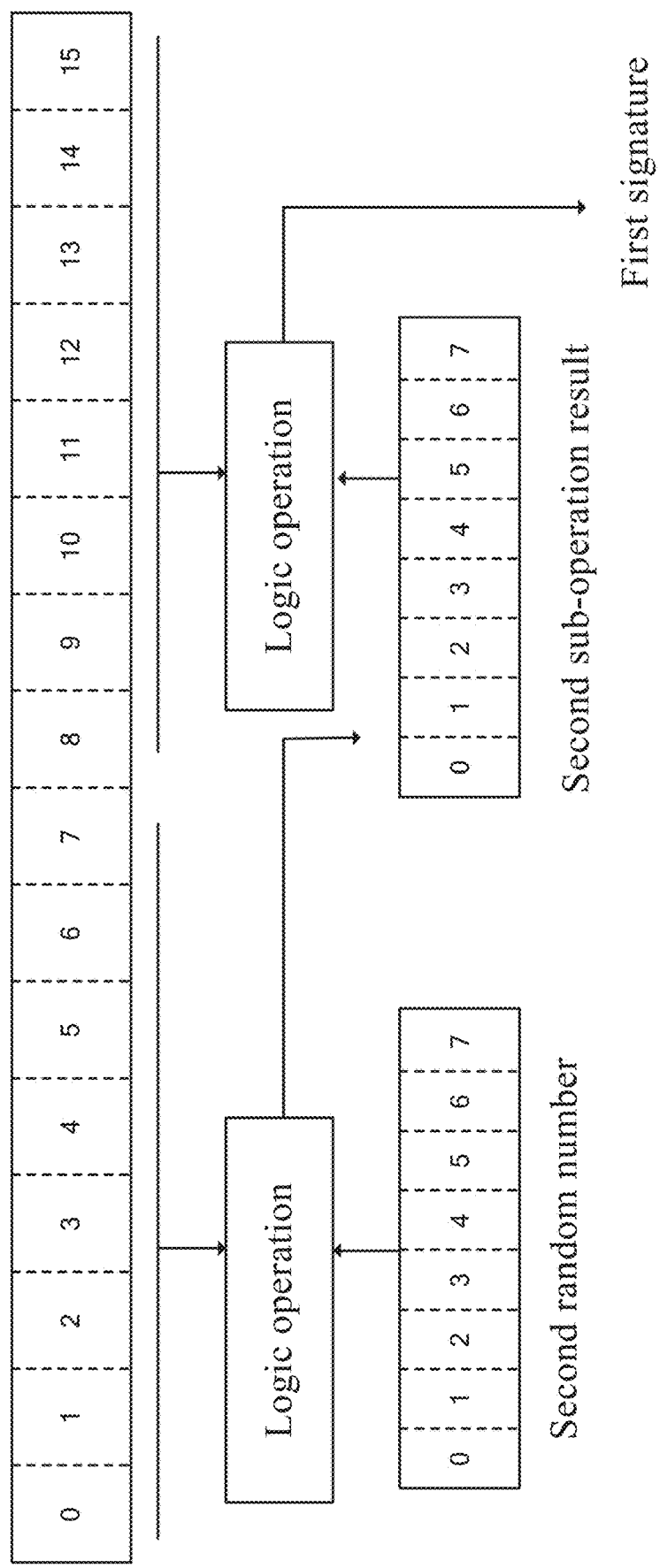
FIG. 7 is another schematic diagram of the data flow for detecting a register shown in an embodiment of the present application.

FIG. 7 is another data flow diagram for detecting a register shown in an embodiment of the present application.

FIG. 7 shows a schematic diagram of a two-stage signature of a first data of 16 bits. The first data includes bit0~bit15, where the first bit to the seventh bit of the first data is bit0~bit7, and the eighth bit to the fifteenth bit of the first data is bit8~bit15. In FIG. 7, the logical operation is performed on bit0~bit7 of the first data and a second random number to obtain a second sub-result, where the number of bits of the second random number can be the same as or different from that of bit0~bit7 of the first data. After obtaining the second sub-result, the logical operation can be performed on the second sub-result and bit8~bit15 of the first data, to obtain a first signature.

It should be noted that the calculation process for the second signature can refer to the calculation process for the first signature, which will not be described in detail here.

In some embodiments, the difficulty and reliability of cracking the first and/or second signature are effectively improved through the two-stage signature operation process as shown above.

In some implementations, in order to further enhance the difficulty and reliability of cracking the first signature and/or the second signature, the signature strength for the first data and/or the second data can also be strengthened by the following methods.

In some embodiments, a first sub result is obtained through the following method.

Firstly, perform specific logical operation on the $0^{th}$ bit to $(n/2-1)^{th}$ bit of a third signature and the first data to obtain the first sub-operation result, and perform specific logical operations on the $(n/2)^{th}$ bit to $(n-1)^{th}$ bit of the third signature and the first data to obtain a second sub-operation result. The third signature is determined based on a first random number and the $(n/2)^{th}$ bit to $(2n-1)^{th}$ bit of the first data. The specific logical operation can be an XOR logical operation, etc.

Then, concatenate the first sub-operation result and the second sub-operation result to obtain the first sub-result.

For example, a third signature is obtained through the following method: performing a specific logical operation on a first random number and the $n^{th}$ bit to the $(2n-1)^{th}$ bit of the first data, to obtain the third signature. The specific logical operation can be the same as logical operation used in the other implementations.

Figure 8:
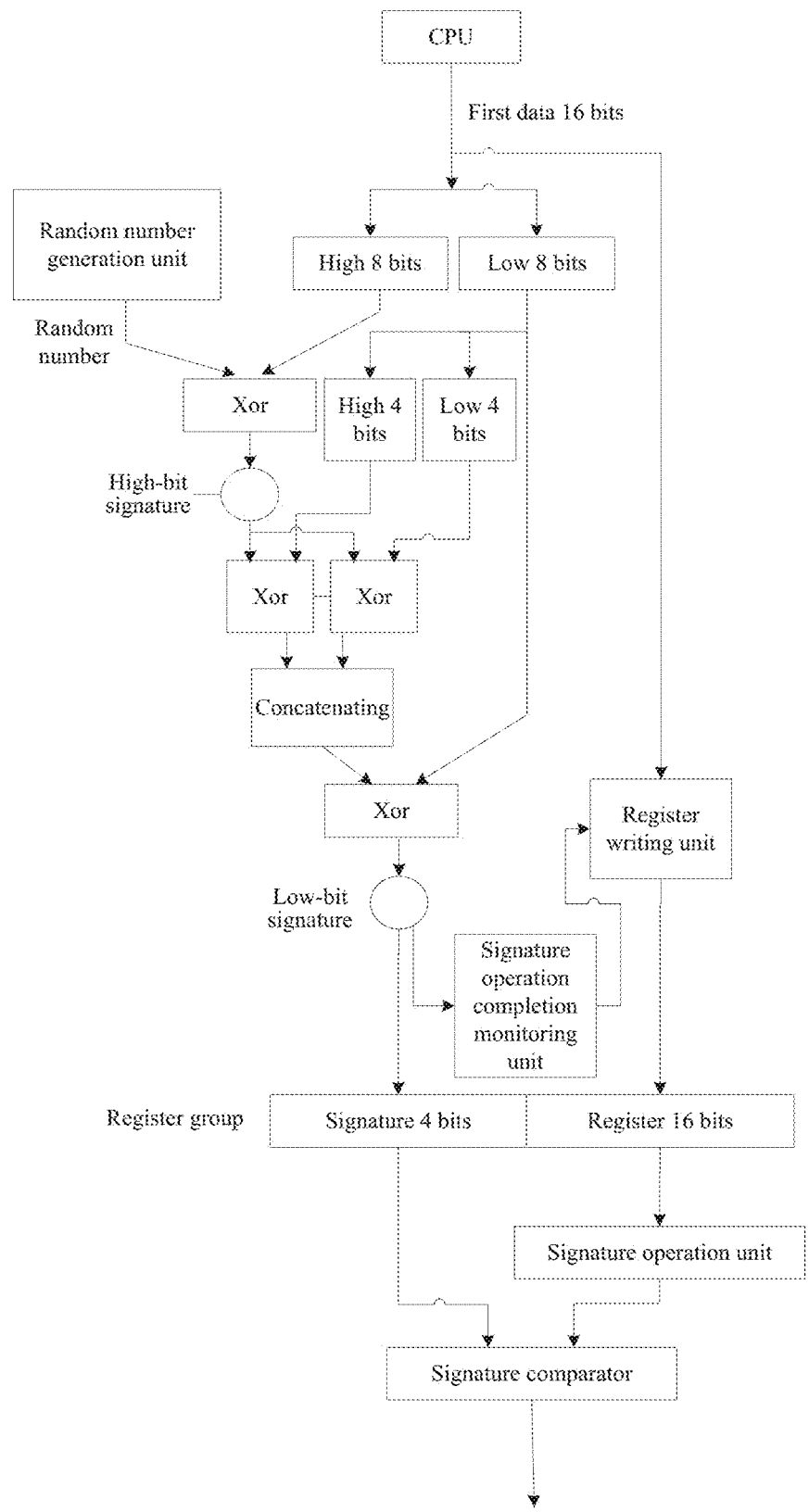
FIG. 8 is another schematic diagram of the data flow for detecting a register shown in an embodiment of the present application.

FIG. 8 is another schematic diagram of the data flow of the detection register shown in an embodiment of the present application.

Referring to FIG. 8, an example is given using the configuration register with a 16-bit data register for illustrative purposes. A signature register is also shown in FIG. 8. A data register and the signature register together form the register group.

After obtaining the first signature using the above methods, the first signature is stored in the signature register. Correspondingly, comparing the first signature and a second signature can include: reading the first signature from the register group to compare the first signature and the second signature.

In some embodiments, the reset value of the register group's registers is the digital signature corresponding to the initial register information and the register initial value.

Taking the critical register (the register that stores configuration information) as an example, when the Central Processing Unit (CPU) performs a write operation on the critical register for the first data, it is directly updated to the data register (16-bit register). At the same time, the digital signature operation is completed, and the output of the monitoring unit becomes "update incomplete". The control register writing unit writes to the signature register (4-bit digital signature) and the data register simultaneously after the digital signature operation is completed. This avoids errors in signature comparison caused by one side updating the signature register or data register first.

The first data is simultaneously split into high 8 bits and low 8 bits. The high 8-bit data and the first random number generated by the random number generation unit (such as 8-bit or 4-bit) are sent to the XOR operation unit to complete the logical operation (such as XOR operation) according to bit. Taking the first random number as an example, if it is 8 bits, the resulting 8-bit result is sent to the high-bit signature operation unit (used to implement the high-bit signature in FIG. 8). The specific signature algorithm and circuit are described in subsequent related implementation examples.

The signature result is 4 bits. The signature result is then XORed with the high 4 bits and low 4 bits of the low 8 bits of the first data respectively. The result is then concatenated to form a new data, which is XORed with the low 8 bits of the first data. The result is sent to the low-bit signature operation unit (used to implement the low-bit signature in FIG. 8) to complete the final digital signature operation.

After completing the digital signature operation, the low-level signature operation unit notifies the digital signature operation completion monitoring unit, and then updates the signature register and data register together with the register writing unit.

The signature operation unit is responsible for performing signature calculation on the data stored in the data register, and sending the calculated result (i.e., the second signature) to the signature comparator.

The signature comparator is responsible for comparing the real-time calculated digital signature with the digital signature stored in the digital signature register. When the signatures do not match, it indicates that the register has been attacked or aged, etc., and can output interrupts and resets. Notify the system to protect and dispose of the main control chip.

In this implementation, the method of signing the first data and then restoring the first data based on the first signature, and then storing the first data is not used. This effectively reduces the risk of errors in the first data and improves the security and reliability of the first data.

In some implementations, the aforementioned second result is obtained through the following method.

Firstly, specific logical operations are performed on a fourth signature and the $n^{th}$ bit to the $(3n/2-1)^{th}$ bit of a first data, to obtain the third sub-operation result. Then, specific logical operations are performed on the fourth signature and the $(3n/2)^{th}$ bit to the $(2n-1)^{th}$ bit of the first data, to obtain the fourth sub-operation result. The fourth signature is determined based on the first random number and the $0^{th}$ bit to the $(n-1)^{th}$ bit of the first data.

Then, concatenate the results of the third and fourth sub-operations to obtain the result of the second sub-operation.

For example, the fourth signature mentioned above can be obtained by performing a specific logical operation on a second random number the $n^{th}$ bit to the $(2n-1)^{th}$ bit of the first data.

Figure 9:
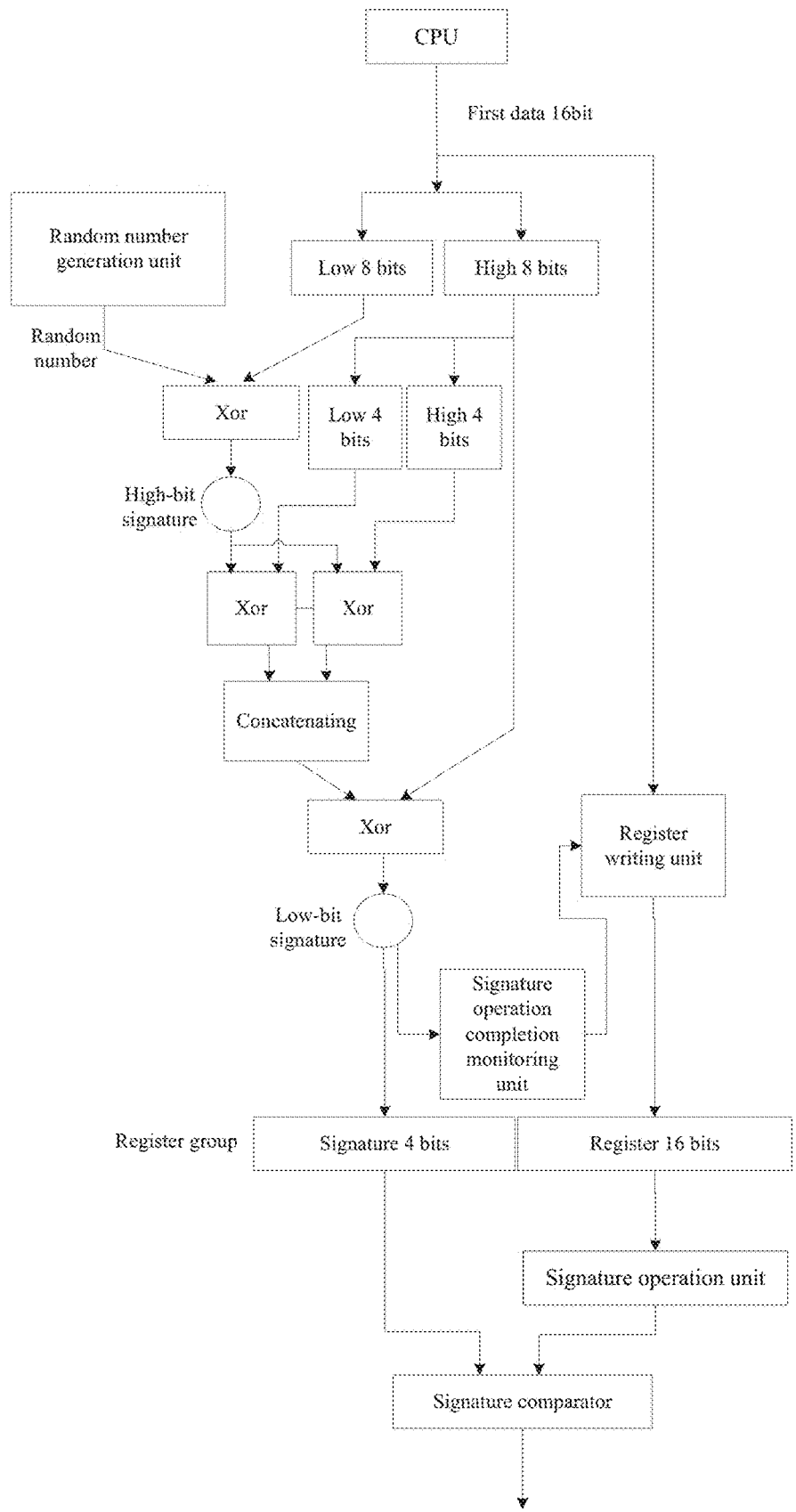
FIG. 9 is another schematic diagram of the data flow for detecting a register shown in an embodiment of the present application.

FIG. 9 is another schematic diagram of the data flow for detecting a register shown in an embodiment of the present application.

Referring to FIG. 9, an illustrative example is given using the configuration register with a data register of 16 bits. The signature register is also shown in FIG. 9. The data register and signature register together form a register group.

In some embodiments, the reset value of the register group's registers is the digital signature corresponding to the initial register information and the initial value of the registers.

Taking the critical register (the register that stores configuration information) as an example, when the CPU performs a write operation on the critical register for the first data, it is directly updated all the way to the data register (a 16-bit register). At the same time, the digital signature operation is completed, and the output of the monitoring unit becomes "update incomplete". The control register writing unit will not write until the digital signature operation is completed and the signature is written into the signature register (a 4-bit digital signature register) and the data register simultaneously. This avoids errors in signature comparison caused by one side updating the signature register or data register first.

The first data is simultaneously split into high 8 bits and low 8 bits. The low 8-bit data and the second random number generated by the random number generation unit are sent to the XOR operation unit to complete logical operations (such as XOR operations) on a bit-by-bit basis. The resulting data is sent to the high-bit signature operation unit. The specific signature algorithm and circuitry can be found in subsequent related implementation examples.

The signature result is 4 bits. This signature result is then XORed with the low 4 bits and high 4 bits of the high 8 bits of the first data. The result is then concatenated to form new data, which is then XORed with the high 8 bits of the first data. The final result is sent to the low-bit signature operation unit to complete the final digital signature operation.

After the low-level signature operation unit completes the digital signature operation, it notifies the digital signature operation completion monitoring unit, and then updates the signature register and data register together with the register writing unit.

A signature operation unit is responsible for performing real-time signature calculation on the data stored in the register, and sending the calculation result (i.e. the second signature) to the signature comparator.

A signature comparator is responsible for comparing the real-time calculated digital signature with the digital signature stored in the digital signature register. When the signatures do not match, it indicates that the register has been attacked or aged. It outputs an interrupt and reset, notifying the system to protect and dispose of the main control chip.

In some embodiments, the control register writing unit writes to the configuration register and the digital signature register simultaneously with the signature, after the digital signature operation is completed. This effectively reduces the risk of signature comparison errors caused by one of the signature or configuration registers being updated first.

The other aspect provided by this application is a circuit for detecting a register.

Figure 10:
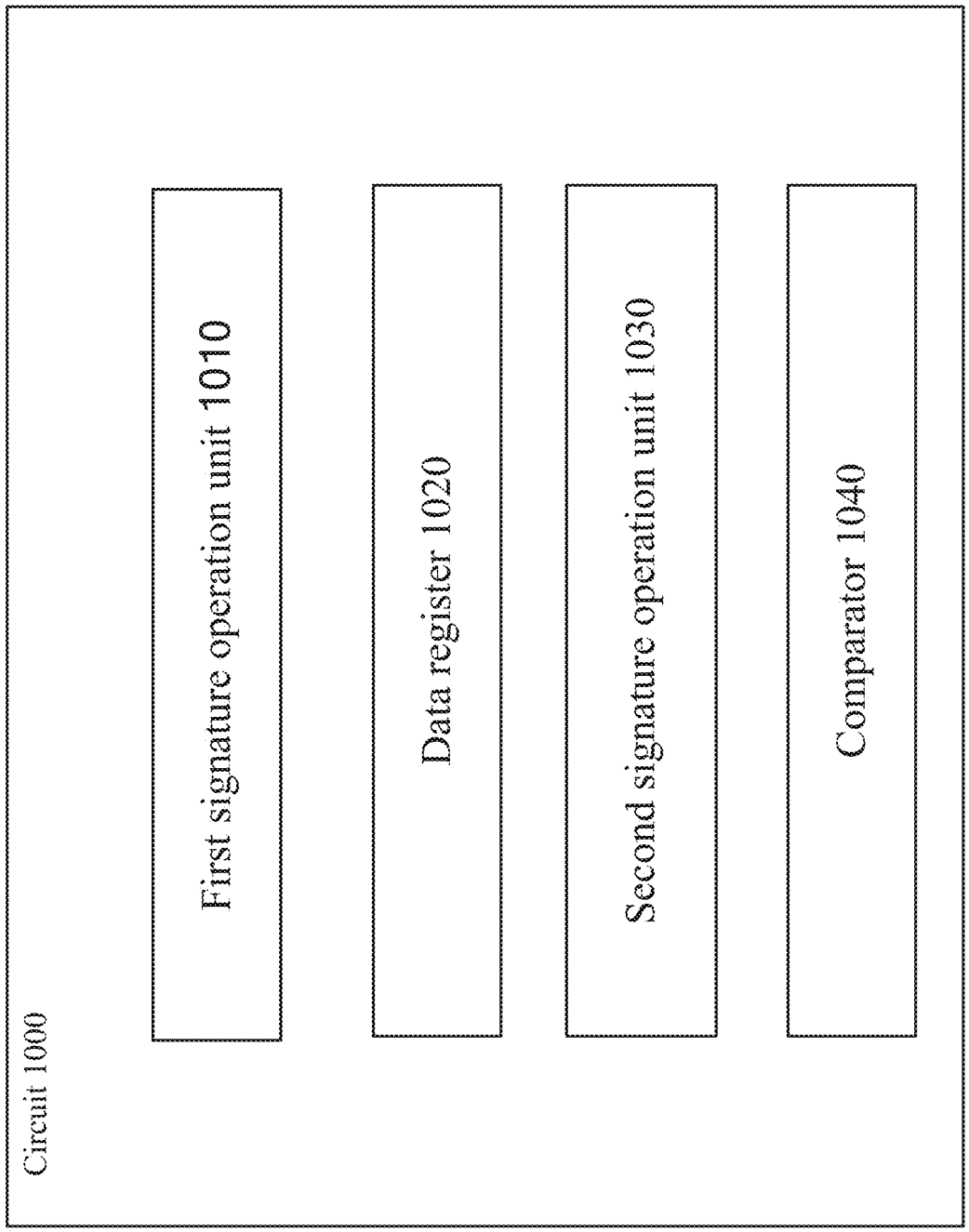
FIG. 10 is a block diagram of a circuit for detecting a register shown in an embodiment of the present application.

FIG. 10 is a block diagram of a detection register circuit shown in an embodiment of the present application.

Referring to FIG. 10, the circuit 1000 for detecting a register may include: a first signature operation unit 1010, a data register 1020, a second signature operation unit 1030, and a comparator 1040.

In some embodiments, the first signature operation unit 1010 is configured to perform a signature operation on the first data, to obtain a first signature.

Data register 1020 is connected to the first signature arithmetic unit and is configured to store the first data.

The second signature operation unit 1030 is connected to the data register and is configured to perform a signature operation on the second data stored in the data register, to obtain a second signature.

Comparator 1040 is respectively connected to the first signature operation unit and the second signature operation unit, and is configured to compare the first signature and the second signature to detect the data register.

In an example, the first signature operation unit 1010 and the second signature operation unit 1030 can be the same operation unit or different operation units.

In some implementations, in order to reduce the risk of signature comparison errors caused by one party updating the signature or configuration register first, the monitoring of whether the signature operation is completed can be carried out, and the first data can be written into the data register only after the signature operation is completed.

Figure 11:
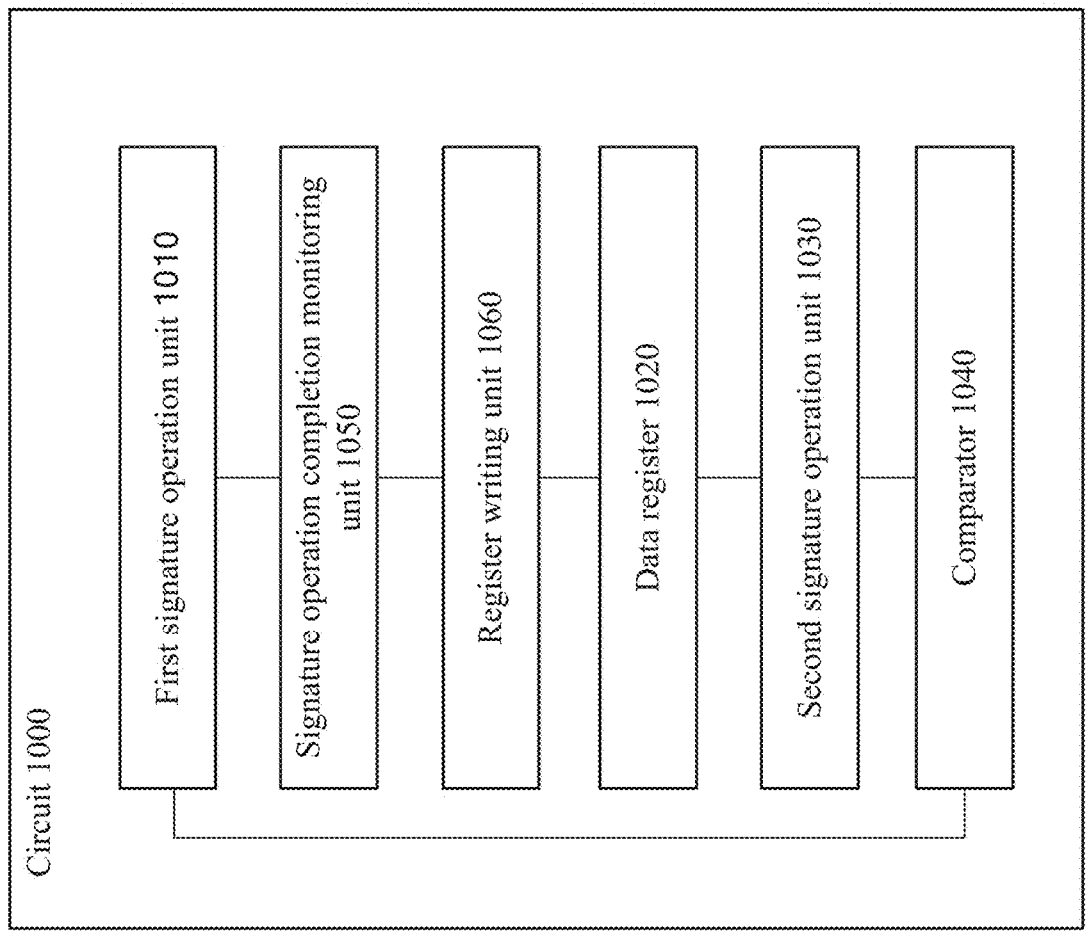
FIG. 11 is a block diagram of a circuit for detecting a register shown in an embodiment of the present application.

FIG. 11 is a block diagram of a circuit for detecting a register shown in an embodiment of the present application.

Referring to FIG. 11, the circuit 1000 of the aforementioned testing register can also include a signature operation completion monitoring unit 1050 and a register writing unit 1060.

In an example, the signature operation is completed and the monitoring unit 1050 is connected to the first signature operation unit 1010, which is configured to respond to the output of the first signature operation unit and output a write signal.

Register writing unit 1060 is respectively connected to signature operation completed monitoring unit 1050 and data register 1020, and is configured to respond to the write signal by writing the first data in the data register.

In some implementations, in order to complete the digital signature operation, the first data and the first signature are simultaneously written into the data register and the signature register, in order to reduce the risk of the first signature and the second signature compared in the comparator corresponding to the first data and the second data of different cycles.

The circuit 1000 of the above-mentioned testing register can also include a signature register.

Figure 12:
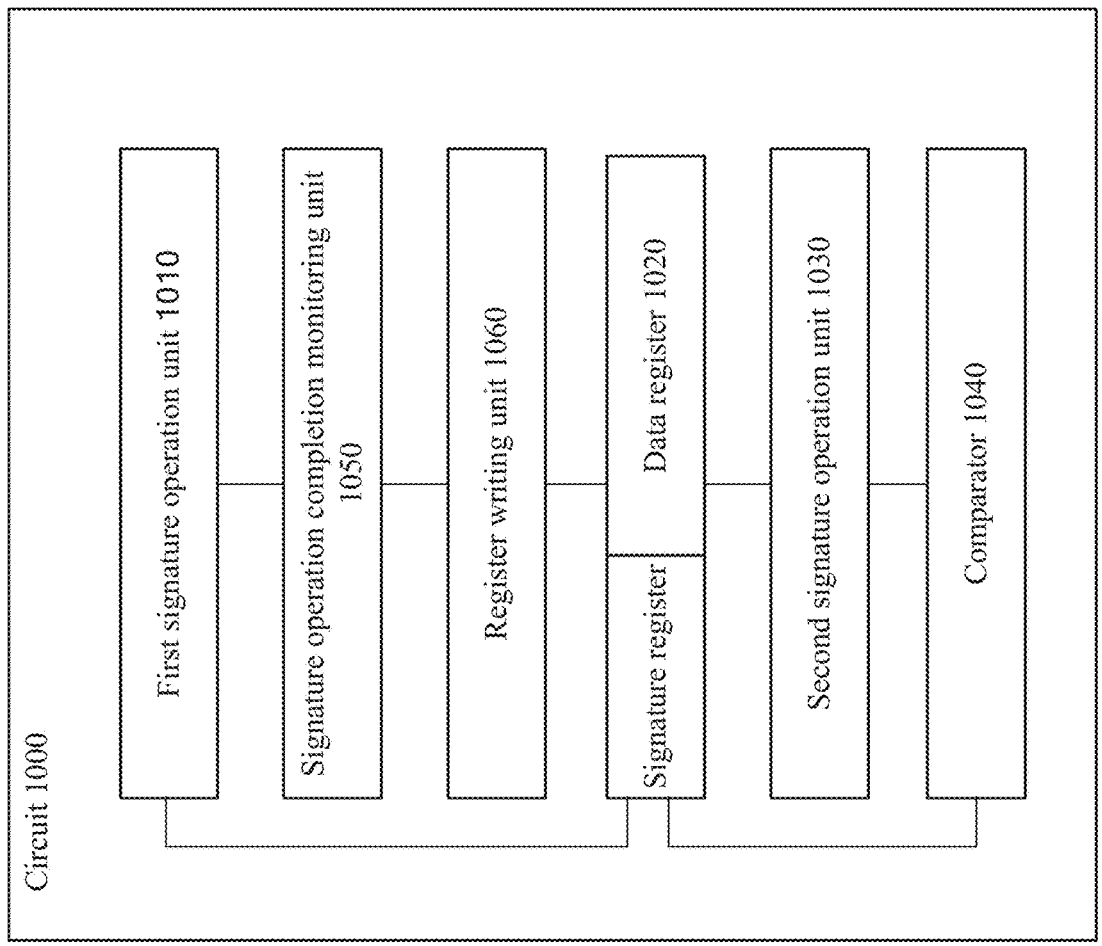
FIG. 12 is a block diagram of a circuit for detecting a register shown in an embodiment of the present application.

FIG. 12 is a block diagram of a circuit for detecting a register shown in an embodiment of the present application.

Referring to FIG. 12, the signature register and data register 1020 together form a register group used for storing a first signature.

Comparator 1040 is also connected to the register group, configured to read the first signature from the register group, and compare the first signature with the second signature.

In some implementations, the circuit 1000 of the aforementioned detection register can also perform exception handling when the first signature and the second signature are inconsistent.

Figure 13:
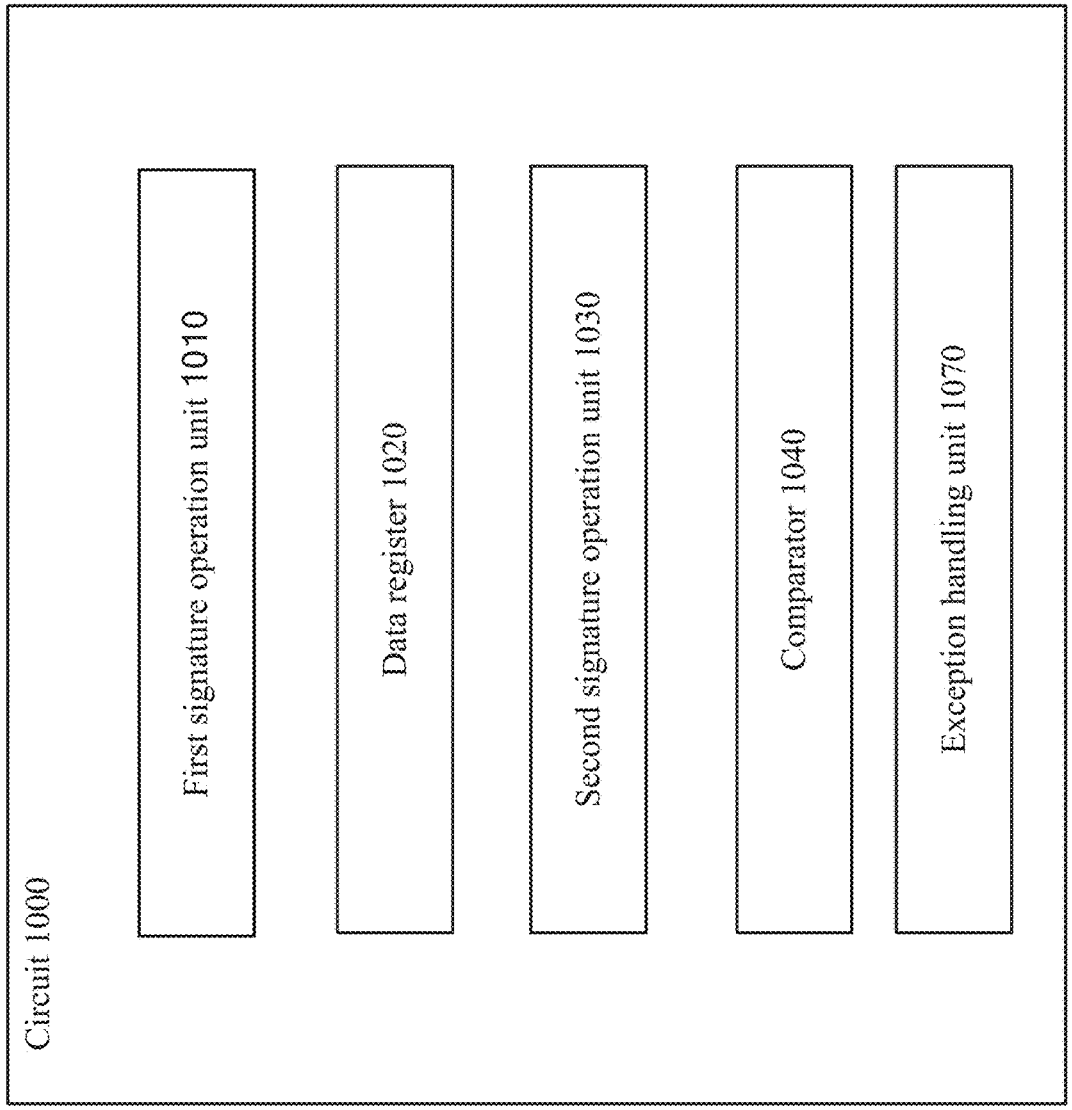
FIG. 13 is a block diagram of a first signature operation unit shown in an embodiment of the present application.

FIG. 13 is a block diagram of a first signature operation unit shown in an embodiment of the present application.

Referring to FIG. 13, the circuit 1000 of the aforementioned detection register can also include an exception handling unit 1070.

For example, the exception handling unit 1070 includes at least one of the following: reset generation unit and/or interrupt generation unit.

The reset generation unit is configured to output a reset signal when the abnormal detection result is abnormal. For example, the first threshold and the second threshold may include multiple levels; occasional abnormal threshold level and abnormal threshold level, etc. When the number of inconsistencies (or consecutive inconsistencies) between the first signature and the second signature is greater than the occasional abnormal threshold level and less than the abnormal threshold level, a reset signal can be output. When the number of inconsistencies (or consecutive inconsistencies) between the first signature and the second signature is greater than the abnormal threshold level, a reset signal and an alarm signal can be output.

Improve the quality of the register through a reset signal. It should be noted that the above output reset signal conditions are exemplary and should not be understood as limiting the scope of this application. In some embodiments, the reset signal will reset the main circuit and clear critical information.

The interrupt generation unit is configured to output an interrupt signal when the abnormal detection result is abnormal. For example, the first threshold and the second threshold may include multiple levels, occasional abnormal threshold level and abnormal threshold level, etc. When the number of inconsistencies (or consecutive inconsistencies) between the first signature and the second signature is greater than the abnormal threshold level, an interrupt signal can be output. The potential risk of the abnormal register to the user can be reduced by the interrupt signal. In some embodiments, the interrupt signal can be sent to the CPU, so that the CPU can respond to the interrupt signal and perform corresponding processing according to the interrupt type, such as destroying valuable information, restarting, and shutting down the TRNG module.

It should be noted that in addition to reset and interrupt handling, other processing methods can also be introduced, such as using registers to generate units, alarm processing, etc., which are not limited here.

In some implementations, the circuit for detecting a register may also include a threshold configuration unit, which can store at least one threshold value.

In some implementations, the circuit 1000 for detecting a register may also include an anomaly analysis unit. The anomaly analysis unit can be part of the anomaly handling module or it can be a separate module.

For example, the anomaly analysis unit is configured to analyze the cause of anomalies based on the relationship between the first data, second data, first signature, and second signature. For instance, if the first data and second data are consistent, but the first signature and second signature are inconsistent, it can be determined that the data register is not anomalous, and the anomaly may be in the signature operation unit and signature register. If the first data and second data are inconsistent, and the first signature and second signature are also inconsistent, it can be determined that the data register and/or signature register have anomalies.

In an example, the abnormal type can be output to the CPU, ECU, etc., in order to adopt corresponding processing methods.

In some implementations, the security and reliability of the first and/or second signature can be increased by adding random numbers.

In some embodiments, the circuit 1000 of the aforementioned testing register may also include a random number generation unit configured to output random numbers.

Correspondingly, the first signature operation unit 1010 includes at least one of the first logical operation unit, the second logical operation unit, or the third logical operation unit.

In an example, a first logical operation unit is configured to perform specific logical operation on a first sub-result and the $0^{th}$ bit to the $(n-1)^{th}$ bit of the first data, to obtain a first signature. The first sub-result is determined based on specific logical operations on a first random number and the $n^{th}$ bit to the $(2n-1)^{th}$ bit of the first data. Refer to the relevant part of Example in FIG. 6, which will not be described here in detail.

A second logical operation unit is configured to perform specific logical operation on a second sub-result and the $n^{th}$ bit to the $(2n-1)^{th}$ bit of the first data, to obtain a first signature. The second sub-result is determined based on specific logical operation performed on a second random number and the $0^{th}$ bit to the $(n-1)^{th}$ bit of the first data. Refer to the relevant part of the implementation example in FIG. 7, which will not be described in detail here.

A third logical operation unit is configured to perform specific logical operation on the $0^{th}$ to $(n-1)^{th}$ bit of the first data and the $n^{th}$ to $(2n-1)^{th}$ bit of the first data, to obtain a first signature.

In some implementations, the circuit 1000 of the aforementioned detection register may also include: a fourth logic operation unit, a fifth logic operation unit, and a first concatenating unit.

In an example, the fourth logical operation unit is connected to the first logical operation unit, and is configured to perform specific logical operations on a third signature and the $0^{th}$ bit to the $(n/2-1)^{th}$ bit of the first data, to obtain a first sub-operation result. The third signature is determined based on a first random number the $n^{th}$ bit to the $(2n-1)^{th}$ bit of the first data.

The fifth logical operation unit is connected to the first logical operation unit, and is configured to perform specific logical operations on a third signature and the $(n/2)^{th}$ bit to $(n-1)^{th}$ bit of the first data, to obtain the second sub-operation result.

A first concatenating unit is respectively connected to the fourth logical operation unit and the fifth logical operation unit, and is configured to concatenate the first sub-operation result and the second sub-operation result to obtain the first sub-result.

The functions implemented by the fourth logic operation unit, the fifth logic operation unit, and the first concatenating unit can refer to the relevant implementation examples in FIG. 8, and will not be described in detail here.

In some implementations, the circuit 1000 of the aforementioned detection register may also include: a sixth logic operation unit, a seventh logic operation unit, and a second concatenating unit.

In an example, a sixth logical operation unit is connected to the second logical operation unit and is configured to perform specific logical operations on a fourth signature and the $n^{th}$ bit to the $(3n/2-1)^{th}$ bit of the first data, obtaining the third sub-operation result. The fourth signature is determined based on a first random number and the $0^{th}$ bit to the $(n-1)^{th}$ bit of and the first data.

A seventh logical operation unit is connected to the second logical operation unit, and is configured to perform specific logical operation on a fourth signature and the $(3n/2)^{th}$ bit to the $(2n-1)^{th}$ bit of the first data, to obtain a fourth sub-operation result.

A second concatenating unit is respectively connected to the sixth logical operation unit and the seventh logical operation unit, and is configured to concatenate the third sub-operation result and the fourth sub-operation result to obtain the second sub-result.

The functions implemented by the sixth logical operation unit, the seventh logical operation unit, and the second concatenating unit can refer to the relevant implementation examples in FIG. 9, and will not be described in detail here.

The following is an illustrative example of the signature operation unit (which may include signature circuits, implementing high-bit signature and low-bit signature as shown in FIG. 8). For ease of understanding, an illustrative example is given for the logical operation principle of the signature circuit.

Table 1 is a table for simulating modulo operation. In Table 1, the first row represents the bit. The second to ninth rows illustrate the modulo process. Modulo operation (also known as modulus, modulo operation, or modulo arithmetic) results in the remainder of one number divided by another.

TABLE 1

Table of Analog Modulo Division Operation

| 11 | 10 | 9  | 8  | 7  | 6  | 5  | 4  | 3  | 2  | 1  | 0  |
|----|----|----|----|----|----|----|----|----|----|----|----|
| d7 | d6 | d5 | d4 | d3 | d2 | d1 | d0 | 0  | 0  | 0  | 0  |
| d7 |    |    |    | d7 | d7 |    |    |    |    |    |    |
|    | d6 |    |    |    | d6 |    |    |    |    |    |    |
|    |    | d5 |    |    |    | d5 | d5 |    |    |    |    |
|    |    |    | d4 |    |    |    | d4 | d4 |    |    |    |
|    |    |    | d7 |    |    |    | d7 | d7 |    |    |    |
|    |    |    |    | d3 |    |    |    | d3 | d3 |    |    |
|    |    |    |    | d6 |    |    |    | d6 | d6 |    |    |
|    |    |    |    | d7 |    |    |    | d7 | d7 |    |    |
|    |    |    |    |    | d2 |    |    |    | d2 | d2 |    |
|    |    |    |    |    | d5 |    |    |    | d5 | d5 |    |
|    |    |    |    |    | d6 |    |    |    | d6 | d6 |    |
|    |    |    |    |    |    | d1 |    |    |    | d1 | d1 |
|    |    |    |    |    |    | d4 |    |    |    | d4 | d4 |
|    |    |    |    |    |    | d5 |    |    |    | d5 | d5 |
|    |    |    |    |    |    | d7 |    |    |    | d7 | d7 |
|    |    |    |    |    |    |    | d0 |    |    | d0 | d0 |
|    |    |    |    |    |    |    | d3 |    |    | d3 | d3 |
|    |    |    |    |    |    |    | d4 |    |    | d4 | d4 |
|    |    |    |    |    |    |    | d6 |    |    | d6 | d6 |
|    |    |    |    |    |    |    |    | d2 | d1 | d0 | d0 |
|    |    |    |    |    |    |    |    | d3 | d2 | d1 | d3 |
|    |    |    |    |    |    |    |    | d5 | d4 | d3 | d4 |
|    |    |    |    |    |    |    |    | d7 | d6 | d5 | d6 |
|    |    |    |    |    |    |    |    |    | d7 | d6 |    |
|    |    |    |    |    |    |    |    |    |    | d7 |    |
|    |    |    |    |    |    |    |    |    |    |    | 10011 |

Please refer to FIG. 8 for the XOR operation on random numbers and the low 8 bits, which can achieve modular division. The irreducible polynomial (i.e. divisor, which can correspond to the random number in the previous implementation) in the simulation of modular division is 10011 in the lower right corner. The first line represents the bit. The second line, d7, d6, d5 . . . d1, d0, is the input 8-bit data to be signed, and the following is to XOR and eliminate these 8 bits. The irreducible polynomial is 10011, and the third line shows the effect of 10011·d7. In order to eliminate d7 of the data to be signed, the following lines are used to eliminate d6~d0 in turn, and the remaining low four bits are the result of the digital signature. In modular division, XOR operation is performed, and when the same two bits appear, the bit can be eliminated. Therefore, it can be seen that after modular division, only the lowest 4 bits are left in the final result. The formulas for bit0~bit3 are shown in equations (1)~(4).

$$bit0 = d0 \wedge d3 \wedge d4 \wedge d6 \qquad \text{Formula (0)}$$

$$bit1 = d0 \wedge d1 \wedge d3 \wedge d5 \wedge d6 \wedge d7 \qquad \text{formula (2)}$$

$$bit2 = d1 \wedge d2 \wedge d4 \wedge d6 \wedge d7 \qquad \text{formula (3)}$$

$$bit3 = d2 \wedge d3 \wedge d5 \wedge d7 \qquad \text{Formula (4)}$$

Therefore, the corresponding signature circuit is directly implemented according to the above operation.

Figure 14:
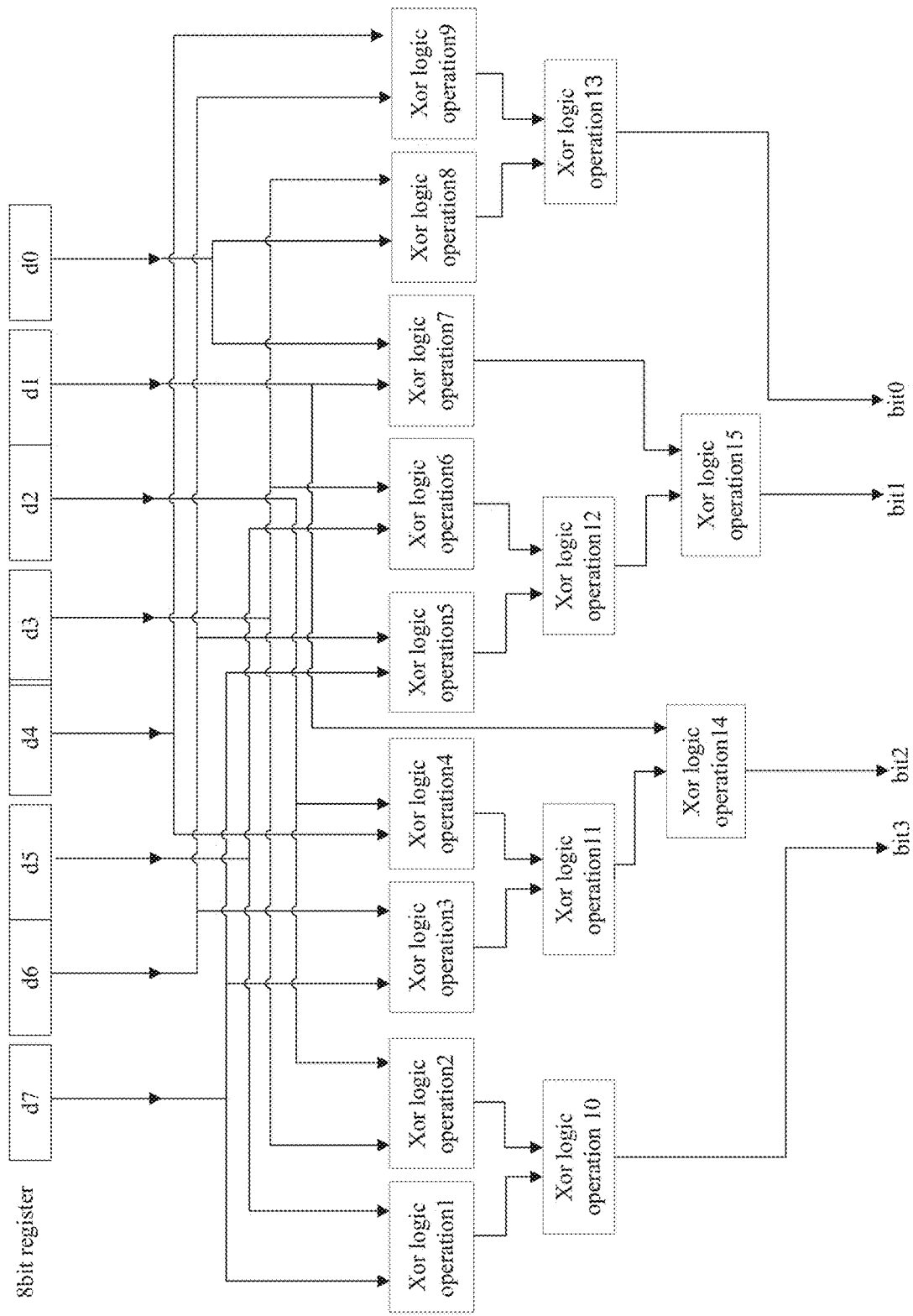
FIG. 14 is a circuit diagram of a signature circuit shown in an embodiment of the present application.

FIG. 14 is a circuit diagram of a signature circuit shown in an embodiment of the present application.

FIG. 14 shows the circuit diagram of a signature circuit with a first data of 8 bits. The signature circuit may include 15 XOR logic operation circuits to achieve XOR logic operations 1 to 15.

In an example, the XOR logic operation 1 is used to perform XOR logic operation on d7 and d5.

The XOR logical operation 2 is used to perform XOR logical operation on d3 and d2.

XOR logic operation 3 is used to perform XOR logic operation on d7 and d6.

The XOR logic operation 4 is used to perform XOR logic operation on d4 and d2.

The XOR logic operation 5 is used to perform XOR logic operation on d7 and d6.

The XOR logic operation 6 is used to perform XOR logic operation on d5 and d3.

The XOR logic operation 7 is used to perform XOR logic operation on d1 and d0.

The XOR logical operation 8 is used to perform XOR logical operation on do and d3.

The XOR logical operation 9 is used to perform XOR logical operation on d6 and d4.

The XOR logic operation 10 is used to perform XOR logical operation on the results of XOR logical operation 1 and XOR logical operation 2, respectively.

The XOR logic operation 11 is used to perform XOR logic operation on the results of XOR logic operation 3 and XOR logic operation 4, respectively.

The XOR logic operation 12 is used to perform XOR logic operation on the results of XOR logic operation 5 and XOR logic operation 6, respectively.

The XOR logic operation 13 is used to perform XOR logic operation on the results of XOR logic operation 8 and XOR logic operation 9, respectively.

The XOR logic operation 14 is used to perform XOR logic operation on the result of XOR logic operation 11 and d1.

The XOR logic operation 15 is used to perform XOR logic operation on the results of XOR logic operation 12 and XOR logic operation 7, respectively.

Figure 15:
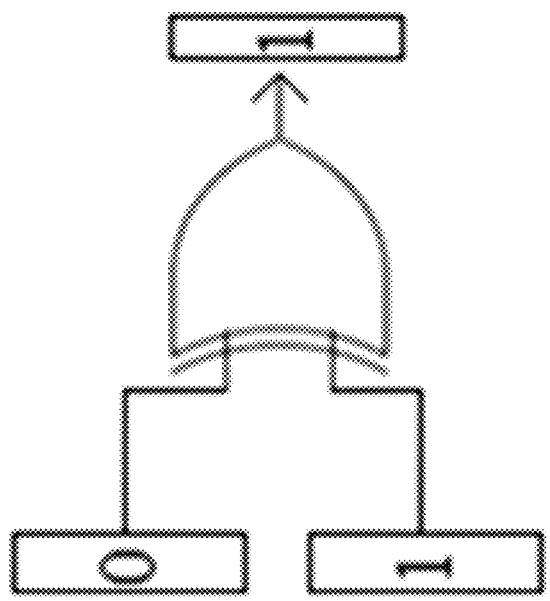
FIG. 15 is a circuit diagram of an XOR logic circuit shown in an embodiment of the present application.

FIG. 15 is a circuit diagram of an XOR logic circuit shown in an embodiment of the present application.

Referring to FIG. 15, an example is given to illustrate the XOR logic operation with 1 bit. XOR (exclusive OR, abbreviated as xor) is a mathematical operator that is applied to logical operations. If the values of a and b are different, the XOR result is 1. If the values of a and b are the same, the XOR result is 0. In FIG. 15, a is 0 and b is 1, so a xor b=1.

Some embodiments provide a low-bit fast digital signature calculation method and corresponding circuit, which can quickly calculate the first signature of the first data with fewer registers, while reducing hardware costs and accelerating calculation speed.

Figure 16:
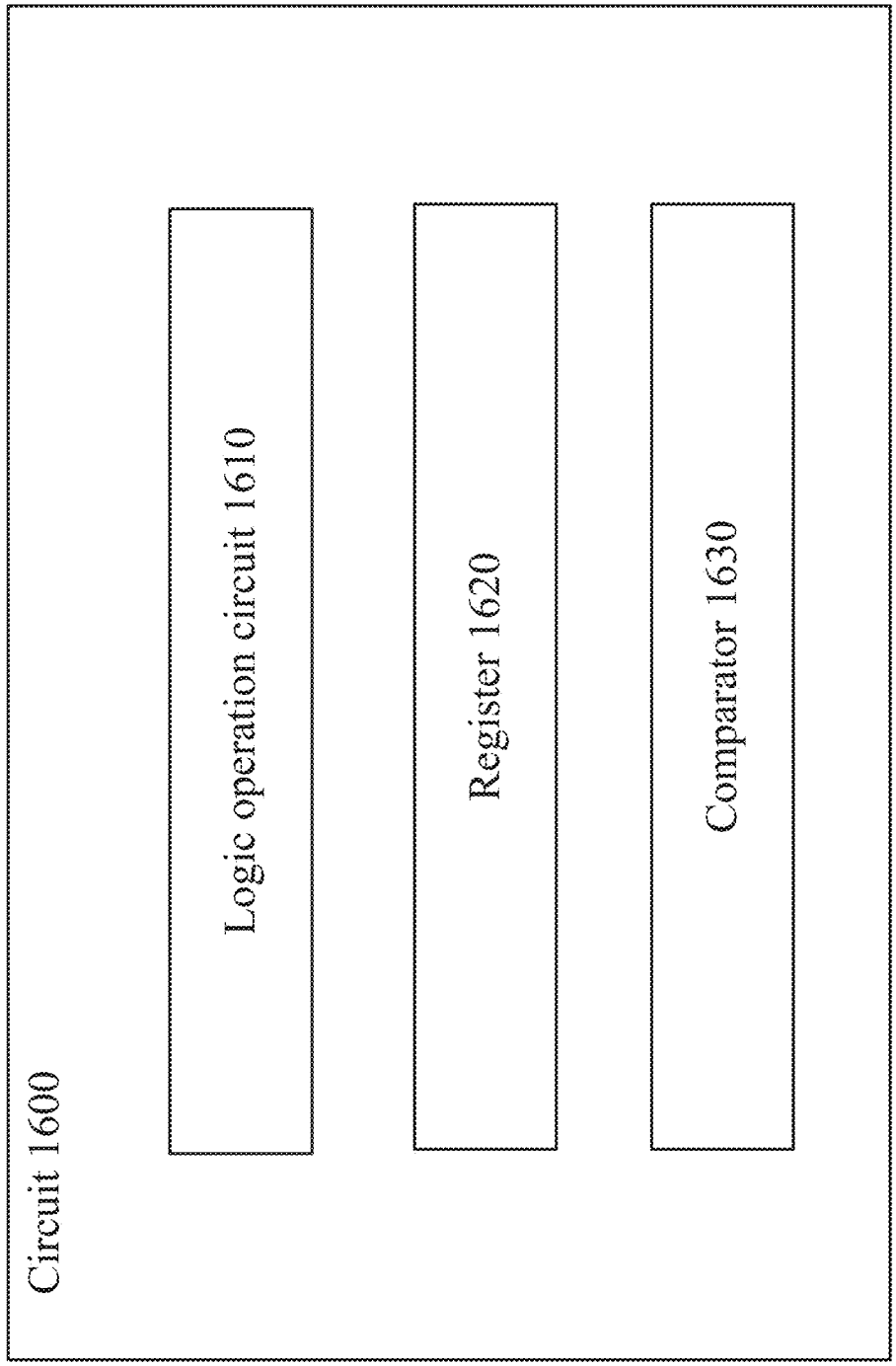
FIG. 16 is a schematic diagram of a structure of a device for detecting a register shown in an embodiment of the present application.

FIG. 16 is a schematic diagram showing the structure of a device for detecting a register illustrated in an embodiment of the present application.

Referring to FIG. 16, the apparatus 1600 for detecting a register may include logic operation circuit 1610, register 1620, and comparator 1630.

In an example, the logical operation circuit 1610 is used to perform logical operations on an obtained first and/or an obtained second data, to obtain a first signature corresponding to the first data, and/or the second signature corresponding to the second data.

Register 1620 is used to store at least one of the first data, second data, first signature, or second signature.

Comparator 1630 is used to compare the first data and the second data, or to compare the first signature and the second signature, in order to detect a register.

Regarding the devices mentioned in the above implementation examples, the specific methods of operation performed by each module have been described in detail in the relevant implementation examples of the method, and will not be further elaborated here.

The other aspect provided in this application is a radar.

Figure 17:
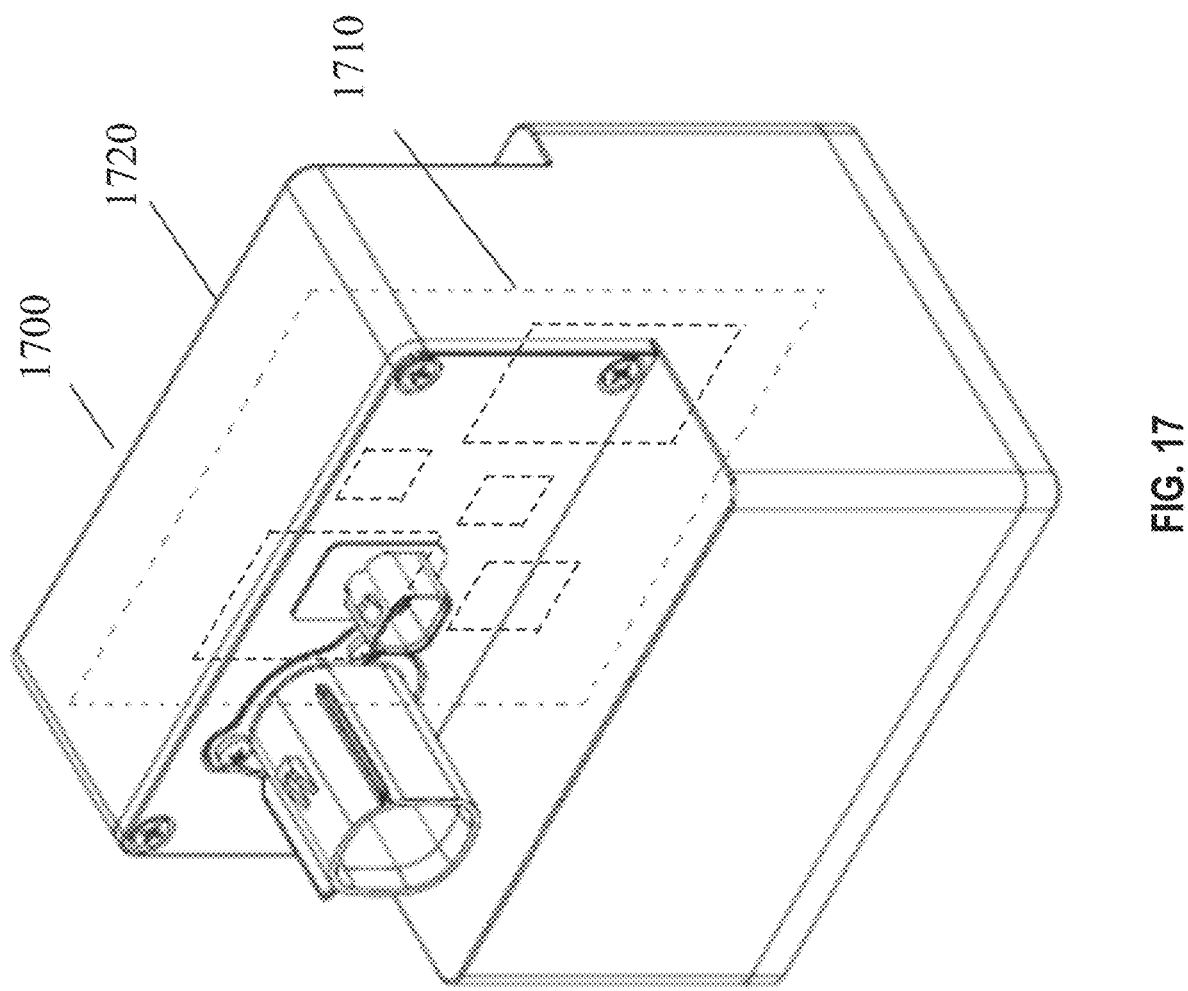
FIG. 17 is a schematic diagram of a structure of a radar shown in an embodiment of this application.

FIG. 17 is a schematic diagram of the structure of a radar shown in an embodiment of the present application.

Referring to FIG. 17, the radar 1700 can include a circuit for generating registers as shown above. For example, the circuit for generating registers can include a circuit for detecting registers as shown above. The circuit for generating registers can be set on the circuit board 1710, which can have multiple chips such as a central control chip. The circuit board 1710 can be set in the housing 1720.

Radar can refer to various types of radar, such as LIDAR, millimeter wave radar, and ultrasonic radar. Radar can be either a scanning radar or a non-scanning radar.

The following is an illustrative example using a scanning type of LiDAR.

For example, MEMS-based LiDAR can dynamically adjust its scanning mode to focus on specific objects, collect detailed information on smaller and farther objects, and identify them. The inertial moment of MEMS-based LiDAR is not large, allowing for fast movement and tracking of 2D scanning mode in less than a second.

For example, Flash LiDAR can quickly record the entire scene, avoiding various troubles caused by the movement of the target or LiDAR during the scanning process. The radar system will use a micro-sensor array to collect laser beams reflected back in different directions.

For example, a row of transmitters mounted on a phased array laser radar can change the direction of the laser beam by adjusting the relative phase of the signal.

For example, the mechanical rotating laser radar is an early developed laser radar, and currently the technology is relatively mature. However, the system structure of the mechanical rotating laser radar is very complex, and the prices of each core component are also quite expensive, comprising the laser, scanner, optical components, photoelectric detector, receiving IC, position and navigation devices, etc.

Taking MEMS solid-state LiDAR as an example, since MEMS solid-state LiDAR scans through the harmonic vibration of the mirror, its scanning path is implemented in spatial order, such as a slow axis scanning field from top to bottom and a fast axis scanning field from left to right. Therefore, the division of the detection range of MEMS solid-state LiDAR is based on the division of the field of view angle corresponding to the slow axis. For example, the vertical field of view angle corresponding to the slow axis of MEMS solid-state LiDAR is −13° to 13°.

Taking the mechanical LiDAR in scanning sensors as an example, the mechanical LiDAR achieves scanning through a mechanical driving device that rotates the optical system 360 degrees, creating a cylindrical detection area with the LiDAR as the center. Therefore, the detection range corresponding to a 360-degree rotation of the mechanical LiDAR is the detection range corresponding to one frame of data. Therefore, the division of the detection range for one cycle of the mechanical LiDAR is generally based on the division of the rotation angle.

For non-scanning LiDAR, the image is processed and converted into a digital signal that can be recognized by a computer through the internal photosensitive component circuit and control component. Then, it is input to the computer through a parallel port or USB connection and the software restores the image.

The other aspect provided in this application is a type of electronic device.

Figure 18:
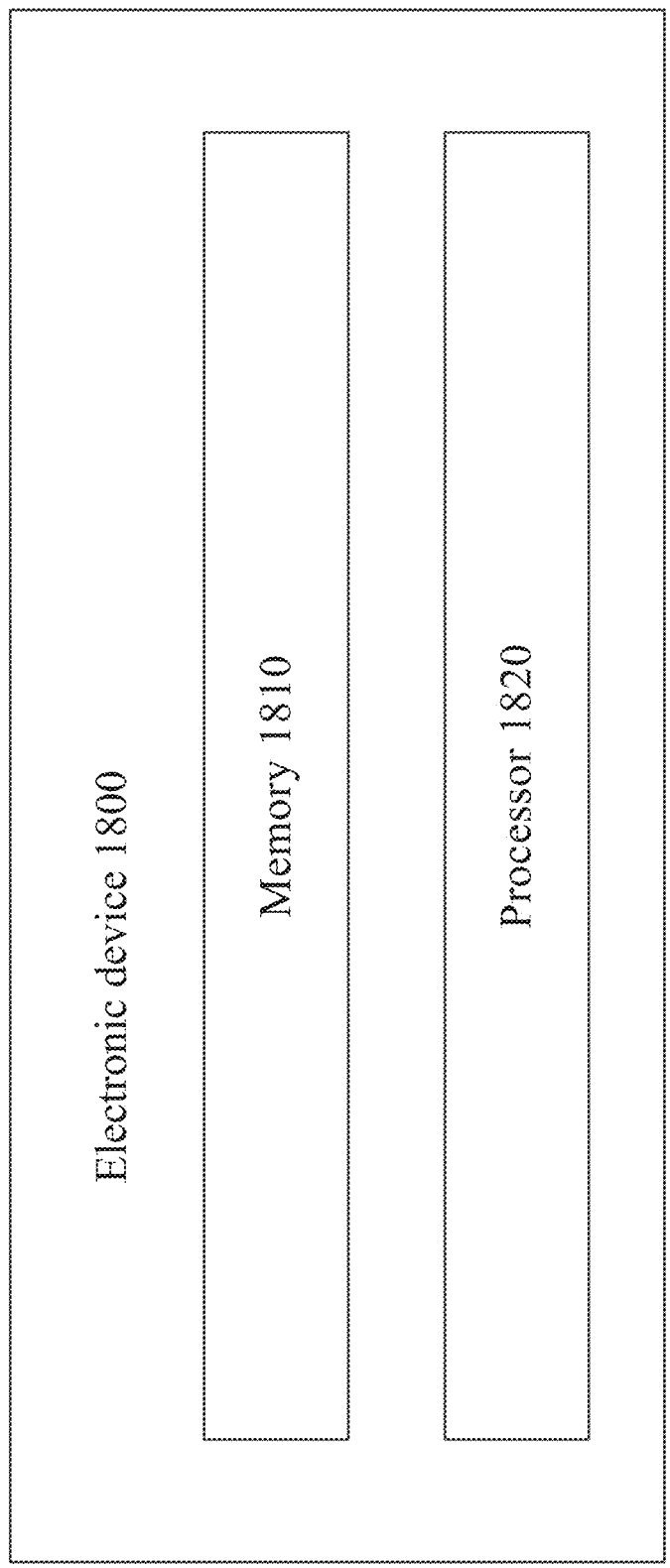
FIG. 18 is a schematic diagram of a structure of an electronic device shown in an embodiment of the present application.

FIG. 18 is a schematic diagram of the structure of an electronic device illustrated in an embodiment of this application.

Referring to FIG. 18, electronic device 1800 may include a memory 1810 and a processor 1820. In addition, at least one of the following can be set up on the electronic device 1800: a register generation circuit, a register detection circuit, or a radar.

The processor 1820 can be a Central Processing Unit (CPU), as well as other general-purpose processors. Digital Signal Processors (DSP), Application Specific Integrated Circuits (ASIC), Field-Programmable Gate Arrays (FPGA), or other programmable logic devices, discrete gates or transistor logic devices, discrete hardware components, etc. General-purpose processors can be microprocessors or any other conventional processors.

Memory 1810 can include various types of storage units, such as system memory, read-only memory (ROM), and permanent storage devices. ROM can store static data or instructions required by processor 1820 or other modules of the computer. The permanent storage device can be a read-write storage device that retains instructions and data even when the computer is powered off, such as non-volatile storage devices. In some embodiments, the permanent storage device uses high-capacity storage devices (such as magnetic or optical disks, flash memory) as permanent storage devices. In other embodiments, the permanent storage device can be a removable storage device (such as a floppy disk, optical drive). System memory can be a read-write storage device or a volatile read-write storage device, such as dynamic random access memory. System memory can store some or all of the instructions and data required by the processor during operation. In addition, memory 1810 can include a combination of any computer-readable storage media, comprising various types of semiconductor storage chips (such as DRAM, SRAM, SDRAM, flash memory, programmable read-only memory), disks, and/or optical disks. In some embodiments, memory 1810 can include removable storage devices that are readable and/or writable, such as laser discs (CDs), read-only digital versatile discs (such as DVD-ROM, dual-layer DVD-ROM), read-only Blu-ray discs, ultra-density optical discs, flash cards (such as SD cards, mini SD cards, Micro-SD cards, etc.), magnetic floppy disks, etc. Computer-readable storage media does not include carriers and momentary electronic signals transmitted wirelessly or wired.

The memory 1810 stores executable code. When the processor 1820 processes the executable code, it can execute some or all of the methods described above.

In addition, according to the method of this application, it can also be implemented as a computer program or computer program product. The computer program or computer program product includes computer program code instructions for executing some or all of the steps in the above method of this application.

In some embodiments, the present application can be implemented as a computer-readable storage medium (or non-transitory machine-readable storage medium or machine-readable storage medium) storing executable code (or computer program or computer instruction code). When the executable code (or computer program or computer instruction code) is executed by a processor of an electronic device (or server, etc.), the processor performs some or all of the steps according to the method described in the present application.

The above has described various embodiments of the present application. The above description is exemplary and not exhaustive, and is not limited to the disclosed embodiments. Many modifications and changes are apparent to those skilled in the art without departing from the scope and spirit of the disclosed embodiments. The selection of terminology used in this article is intended to best explain the principles, practical applications, or improvements to technology in the market of each embodiment, or to enable other ordinary skilled persons in this technical field to understand the disclosed embodiments in this article.

What is claimed is:

1. A method for detecting a register, comprising:
    performing a signature operation on a first data to obtain a first signature, which comprises: performing a specific logical operation on a random number and multiple bits of the first data, to obtain the first signature, wherein the first data comprises 2n bits, and n is an integer greater than or equal to 1;
    storing the first data in a data register;
    performing the signature operation on a second data stored in the data register, to obtain a second signature; and
    comparing the first signature and the second signature to detect the data register,
    wherein the performing the specific logical operation on the random number and multiple bits of the first data, to obtain the first signature, comprises one of the following:
        performing a specific logical operation on the $0^{th}$ bit to the $(n-1)^{th}$ bit of the first data and a first sub-result, to obtain the first signature, wherein the first sub-result is determined based on a first random number and the $n^{th}$ bit to the $(2n-1)^{th}$ bit of the first data;
        performing a specific logical operation on the $n^{th}$ bit to the $(2n-1)^{th}$ bit of the first data and a second sub-result, to obtain the first signature, wherein the second sub-result is determined based on a second random number and the $0^{th}$ bit to the $(n-1)^{th}$ bit of the first data; or
        performing a specific logical operation on the $0^{th}$ bit to the $(n-1)^{th}$ bit of the first data and the $n^{th}$ bit to the $(2n-1)^{th}$ bit of the first data, to obtain the first signature;
    wherein the first sub-result is obtained by:
        performing a specific logical operation on a third signature and the 0th bit to the $(n/2-1)^{th}$ bit of the first data, to obtain a first sub-operation result, and performing a specific logical operation on the third signature and the $(n/2)^{th}$ bit to the $(n-1)^{th}$ bit of the first data, to obtain a second sub-operation result, wherein the third signature is determined based on the first random number and the $n^{th}$ bit to the $(2n-1)^{th}$ bit of the first data; and
        concatenating the first sub-operation result and the second sub-operation result, to obtain the first sub-result.

2. The method according to claim 1, wherein the third signature is obtained by:
    performing a specific logical operation on the first random number and the $n^{th}$ bit to the $(2n-1)^{th}$ bit of the first data, to obtain the third signature.

3. The method according to claim 1, wherein the second sub-result is obtained by:
    performing a specific logical operation on a fourth signature and the $n^{th}$ bit to the $(3n/2-1)^{th}$ bit of the first data, to obtain a third sub-operation result, and performing a specific logical operation on the fourth signature and the $(3n/2)^{th}$ bit to the $(2n-1)^{th}$ bit of the first data, to obtain a fourth sub-operation result, wherein the fourth signature is determined based on the first random number and the $0^{th}$ bit to the $(n-1)^{th}$ bit of the first data; and
    concatenating the third sub-operation result and the fourth sub-operation result, to obtain the second sub-result.

4. The method according to claim 3, wherein the fourth signature is obtained by:
    performing a specific logical operation on the second random number and the $n^{th}$ bit to the $(2n-1)^{th}$ bit of the first data, to obtain the fourth signature.

5. The method according to claim 1, further comprising:
    after obtaining the first signature, storing the first signature in a signature register, wherein the data register and the signature register form a register group;
    the comparing the first signature and the second signature comprises:
    reading the first signature from the register group, to compare the first signature and the second signature.

6. The method according to claim 1, further comprising:
    performing at least one of interrupt processing or reset processing on the register, when the first signature and the second signature do not match.

7. A circuit for detecting a register, comprising:
    a first signature operation unit configured to perform a signature operation on a first data to obtain a first signature;
    a data register connected to the first signature operation unit, wherein the data register is configured to store the first data;
    a second signature operation unit connected to the data register, wherein the second signature operation unit is configured to perform a signature operation on a second data stored in the data register and to obtain a second signature;
    a comparator connected to the first signature operation unit and the second signature operation unit, respectively, wherein the comparator is configured to compare the first signature and the second signature to detect the data register; and
    a random number generation unit configured to output a random number, wherein the first signature operation unit comprises at least one of the following:
  a first logic operation unit configured to perform a specific logic operation on the $0^{th}$ bit to the $(n-1)^{th}$ bit of the first data and a first sub-result, to obtain the first signature, wherein the first sub-result is determined based on a specific logic operation on the $n^{th}$ bit to the $(2n-1)^{th}$ bit of the first data and a first random number;
  a second logic operation unit configured to perform a specific logic operation on the $n^{th}$ bit to the $(2n-1)^{th}$ bit of the first data and a second sub-result, to obtain the first signature, wherein the second sub-result is determined based on a specific logic operation on the $0^{th}$ bit to the $(n-1)^{th}$ bit of the first data and a second random number; or
  a third logic operation unit configured to perform a specific logic operation on the $0^{th}$ bit to the $(n-1)^{th}$ bit and the $n^{th}$ bit to the $(2n-1)^{th}$ bit of the first data, to obtain the first signature; and
wherein the first signature operation unit further comprises:
  a fourth logic operation unit connected to the first logic operation unit, wherein the fourth logic operation unit is configured to perform a specific logic operation on a third signature and the $0^{th}$ bit to the $(n/2-1)^{th}$ bit of the first data to obtain a first sub-operation result, wherein the third signature is determined based on the $n^{th}$ bit to the $(2n-1)^{th}$ bit of the first data and the first random number;
  a fifth logic operation unit connected to the first logic operation unit, wherein the fifth logic operation unit is configured to perform a specific logic operation on the third signature and the $(n/2)^{th}$ bit to the $(n-1)^{th}$ bit of the first data, to obtain a second sub-operation result; and
  a first concatenation unit connected to the fourth logic operation unit and the fifth logic operation unit, wherein the first concatenation unit is configured to concatenate the first sub-operation result and the second sub-operation result to obtain the first sub-result.

8. The circuit according to claim 7, further comprising:
a signature operation completion monitoring unit connected to the first signature operation unit, wherein the signature operation completion monitoring unit is configured to output a write signal in response to the first signature output by the first signature operation unit; and
a register writing unit connected to the data register, wherein the register writing unit is configured to write the first data into the data register in response to the write signal.

9. The circuit according to claim 7, further comprising:
a signature register configured to store the first signature, wherein the signature register and the data register form a register group,
wherein the register group connects with the comparator, and the comparator is configured to read the first signature from the register group and to compare the first signature with the second signature.

10. The circuit according to claim 7, further comprising:
a sixth logic operation unit connected to the second logic operation unit, wherein the sixth logic operation unit is configured to perform a specific logic operation on a fourth signature and the $n^{th}$ bit to the $(3n/2-1)^{th}$ bit of the first data to obtain a third sub-operation result, wherein the fourth signature is determined based on the $0^{th}$ bit to the $(n-1)^{th}$ bit of the first data and the first random number;
a seventh logic operation unit connected to the second logic operation unit, wherein the seventh logic operation unit is configured to perform a specific logic operation on the fourth signature and the $(3n/2)^{th}$ bit to the $(2n-1)^{th}$ bit of the first data to obtain a fourth sub-operation result; and
a second concatenation unit connected to the sixth logic operation unit and the seventh logic operation unit, wherein the second concatenation unit is configured to concatenate the third sub-operation result and the fourth sub-operation result to obtain the second sub-result.

11. An electronic device comprising:
a processor; and
a memory storing executable code that, when executed by the processor, causes the processor to perform the following:
performing a signature operation on a first data to obtain a first signature;
storing the first data in a data register;
performing the signature operation on a second data stored in the data register, to obtain a second signature; and
comparing the first signature and the second signature to detect the data register,
wherein the performing the signature operation on the first data to obtain the first signature comprises:
  performing a specific logical operation on a random number and multiple bits of the first data, to obtain the first signature, wherein the first data comprises 2n bits, and n is an integer greater than or equal to 1,
wherein the performing the specific logical operation on the random number and multiple bits of the first data, to obtain the first signature, comprises one of the following:
  performing a specific logical operation on the $0^{th}$ bit to the $(n-1)^{th}$ bit of the first data and a first sub-result, to obtain the first signature, wherein the first sub-result is determined based on a first random number and the $n^{th}$ bit to the $(2n-1)^{th}$ bit of the first data;
  performing a specific logical operation on the $n^{th}$ bit to the $(2n-1)^{th}$ bit of the first data and a second sub-result, to obtain the first signature, wherein the second sub-result is determined based on a second random number and the $0^{th}$ bit to the $(n-1)^{th}$ bit of the first data; or
  performing a specific logical operation on the $0^{th}$ bit to the $(n-1)^{th}$ bit of the first data and the $n^{th}$ bit to the $(2n-1)^{th}$ bit of the first data, to obtain the first signature, and
wherein the first sub-result is obtained by:
  performing a specific logical operation on a third signature and the $0^{th}$ bit to the $(n/2-1)^{th}$ bit of the first data, to obtain a first sub-operation result, and performing a specific logical operation on the third signature and the $(n/2)^{th}$ bit to the $(n-1)^{th}$ bit of the first data, to obtain a second sub-operation result, wherein the third signature is determined based on the first random number and the $n^{th}$ bit to the $(2n-1)^{th}$ bit of the first data; and
  concatenating the first sub-operation result and the second sub-operation result, to obtain the first sub-result.

12. The electronic device according to claim 11, wherein the third signature is obtained by:

performing a specific logical operation on the first random number and the $n^{th}$ bit to the $(2n-1)^{th}$ bit of the first data, to obtain the third signature.

* * * * *